US012700024B2

(12) United States Patent
Rigetti et al.

(10) Patent No.: US 12,700,024 B2
(45) Date of Patent: Aug. 4, 2026

(54) PARCELLED QUANTUM RESOURCES

(71) Applicant: Rigetti & Co, LLC, Berkeley, CA (US)

(72) Inventors: Chad Tyler Rigetti, Walnut Creek, CA (US); Robert Stanley Smith, Emeryville, CA (US); Matthew J. Reagor, San Rafael, CA (US); Michael Rust, Martinez, CA (US); Eric Christopher Peterson, Miami, FL (US); Nikolas Anton Tezak, Oakland, CA (US); Anand Desai, San Francisco, CA (US); Glenn Jones, Berkeley, CA (US); David Bryant, Oakland, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 0 days.

(21) Appl. No.: 19/072,138

(22) Filed: Mar. 6, 2025

(65) Prior Publication Data

US 2026/0038009 A1 Feb. 5, 2026

Related U.S. Application Data

(63) Continuation of application No. 17/220,069, filed on Apr. 1, 2021, now abandoned, which is a continuation
(Continued)

(51) Int. Cl.
*G06Q 30/0283* (2023.01)
*G06N 10/40* (2022.01)
(Continued)

(52) U.S. Cl.
CPC ......... *G06Q 30/0283* (2013.01); *G06N 10/40* (2022.01); *G06N 10/80* (2022.01); *G06Q 30/08* (2013.01)

(58) Field of Classification Search
CPC .... G06Q 30/0283; G06Q 30/08; G06N 10/40; G06N 10/80
(Continued)

(56) References Cited

U.S. PATENT DOCUMENTS 8,897,449 B1 11/2014 Broadbent
9,537,953 B1 * 1/2017 Dadashikelayeh ..... H04L 63/20
(Continued)

FOREIGN PATENT DOCUMENTS

CA 2840958 1/2013
CN 109564639 4/2019
(Continued)

OTHER PUBLICATIONS

Holly Cummins, "Cats, Qubits, and Teleportation: The Spooky World of Quantum Computation Applications (Part 3)", Jul. 14, 2018, infoq.com, 12 pages (Year: 2018).*
(Continued)

*Primary Examiner* — Shannon S Campbell
*Assistant Examiner* — Freda A Nelson
(74) *Attorney, Agent, or Firm* — Henry Patent Law Firm PLLC

(57) ABSTRACT

In a general aspect, methods and systems are described for dynamically partitioning and virtualizing a monolithic quantum-classical hybrid computing resource into multiple different and independently-saleable, as a resource to a user, parcels. These parcels may comprise configurations of qubits and qubit-qubit links on one or more quantum processor units for use by users for running computer programs.

20 Claims, 26 Drawing Sheets

Related U.S. Application Data of application No. PCT/US2019/056727, filed on Oct. 17, 2019, and a continuation-in-part of application No. PCT/US2019/054568, filed on Oct. 3, 2019.

(60) Provisional application No. 62/746,970, filed on Oct. 17, 2018, provisional application No. 62/740,808, filed on Oct. 3, 2018.

(51) Int. Cl.

| | | |
|---|---|---|
| *G06N 10/80* | (2022.01) | |
| *G06Q 30/08* | (2012.01) | |

(58) Field of Classification Search

USPC ................................................ 705/7.35, 400

See application file for complete search history.

(56) References Cited

U.S. PATENT DOCUMENTS

| | | | | |
|---|---|---|---|---|
| 11,270,220 | B1 * | 3/2022 | Richardson | ........... G06F 9/5044 |
| 2012/0254586 | A1 * | 10/2012 | Amin | ........................ G06F 9/44 |
| | | | | 712/E9.002 |
| 2017/0351974 | A1 | 12/2017 | Rose et al. | |
| 2018/0075901 | A1 | 3/2018 | Frank | |
| 2018/0091440 | A1 * | 3/2018 | Dadashikelayeh | .... G06N 10/40 |
| 2018/0114138 | A1 | 4/2018 | Monroe et al. | |
| 2018/0260245 | A1 | 9/2018 | Smith | |
| 2018/0260730 | A1 | 9/2018 | Reagor et al. | |
| 2018/0260732 | A1 * | 9/2018 | Bloom | ................... G06N 10/70 |
| 2018/0308000 | A1 * | 10/2018 | Dukatz | .................. G06N 10/60 |
| 2018/0375790 | A1 | 12/2018 | Dadashikelayeh et al. | |
| 2020/0192710 | A1 * | 6/2020 | Kumar | ................. H05K 7/1489 |
| 2021/0334689 | A1 * | 10/2021 | Klimov | .................. G06N 10/40 |
| 2022/0084085 | A1 | 3/2022 | Rigetti et al. | |

FOREIGN PATENT DOCUMENTS

| | | | | |
|---|---|---|---|---|
| EP | 3861489 | 8/2021 | | |
| WO | 2007147243 | 12/2007 | | |
| WO | WO-2007147243 | A1 * | 12/2007 | ................ G06J 3/00 |
| WO | 2016020648 | 2/2016 | | |
| WO | 2020072819 | 4/2020 | | |
| WO | 2020081805 | 4/2020 | | |

OTHER PUBLICATIONS

EPO, Communication pursuant to Article 94(3) issued in Application No. 19874660.4 on Nov. 29, 2023, 10 pages.

EPO, Extended European Search Report mailed Jul. 28, 2022, in EP 19874660.4, 11 pgs.

EPO, Extended European Search Report mailed Jun. 9, 2022, in EP 19869996.9, 12 pgs.

KIPO, International Search Report and Written Opinion mailed Jan. 23, 2020, in PCT/US2019/054568, 12 pgs.

KIPO, International Search Report and Written Opinion mailed Feb. 27, 2020, in PCT/US2019/056727, 14 pgs.

USPTO, Final Office Action issued in U.S. Appl. No. 17/220,069 on Dec. 18, 2023, 30 pages.

USPTO, Non-Final Office Action issued in U.S. Appl. No. 17/220,069 on Jun. 29, 2023, 36 pages.

USPTO, Final Office Action issued in U.S. Appl. No. 17/220,069 on Sep. 16, 2024, 37 pages.

USPTO, Advisory Action issued in U.S. Appl. No. 17/220,069 on May 8, 2024, 4 pages.

USPTO, Non-Final Office Action issued in U.S. Appl. No. 17/220,069 on Jun. 11, 2024, 43 pages.

USPTO, Interview Summary issued in U.S. Appl. No. 17/220,069 on Feb. 21, 2024, 5 pages.

EPO, Communication pursuant to Article 94(3) issued in Application No. 19869996.9 on May 7, 2024, 7 pages.

Cummins, Holly, "Cats, Qubits, and Teleportation: The Spooky World of Quantum Computation Applications (Part 3)", infoq.com, Jul. 14, 2018, Jul. 14, 2018, 12 pages.

Mccaskey, et al., "Hybrid Programming for Near-term Quantum Computing Systems", arXiv:1805.09279v1, May 23, 2018, 9 pgs.

Vinothina, et al., "A Survey on Resource Allocation Strategies in Cloud Computing", International Journal of Advanced Computer Science and Applications, Jun. 2012, 8 pgs.

EPO, Communication pursuant to Article 94(3) issued in Application No. 19869996.9 on Jan. 16, 2025, 8 pages.

* cited by examiner

1900

2200

Number of Qbits      2201

2202

Qbits    84      2203

2211    Back      Proceed    2212

Step 1      Step 2      Step 3      Step 4

2213

2300

2400

Topology    ~ 2401

Linear

Ring

Fully Connected

Star

Custom 🔒    ~ 2402

2411 ~    ◀ Back    Proceed ▶    ~ 2412

Step 1    Step 2    Step 3    Step 4

2413

PARCELLED QUANTUM RESOURCES

CROSS-REFERENCE TO RELATED APPLICATIONS

This application is a continuation of U.S. patent application Ser. No. 17/220,069, filed Apr. 1, 2021, which is a continuation of International Application PCT/US2019/056727, filed Oct. 17, 2019, which claims priority to U.S. Provisional Application No. 62/746,970 filed Oct. 17, 2018, entitled "Parceled Quantum Resources."

U.S. patent application Ser. No. 17/220,069, filed Apr. 1, 2021, is also a continuation-in-part of International Application PCT/US2019/054568, filed Oct. 3, 2019, which claims priority to U.S. Provisional Application No. 62/740, 808, filed Oct. 3, 2018, and to U.S. Provisional Application No. 62/746,970, filed Oct. 17, 2018, both entitled "Parceled Quantum Resources."

The entire contents of the above-referenced priority applications are hereby incorporated by reference.

BACKGROUND

The following description relates to methods and systems generally related to dynamically partitioning and virtualizing a monolithic quantum-classical hybrid computing resource into multiple different and independently-saleable (as a resource to a user) parcels.

Quantum computers can perform computational tasks by storing and processing information within quantum states of quantum systems. For example, qubits (i.e., quantum bits) can be stored in and represented by an effective two-level sub-manifold of a quantum coherent physical system. A variety of physical systems have been proposed for quantum computing applications. Examples include superconducting circuits, trapped ions, spin systems and others.

DETAILED DESCRIPTION

Figure 1:
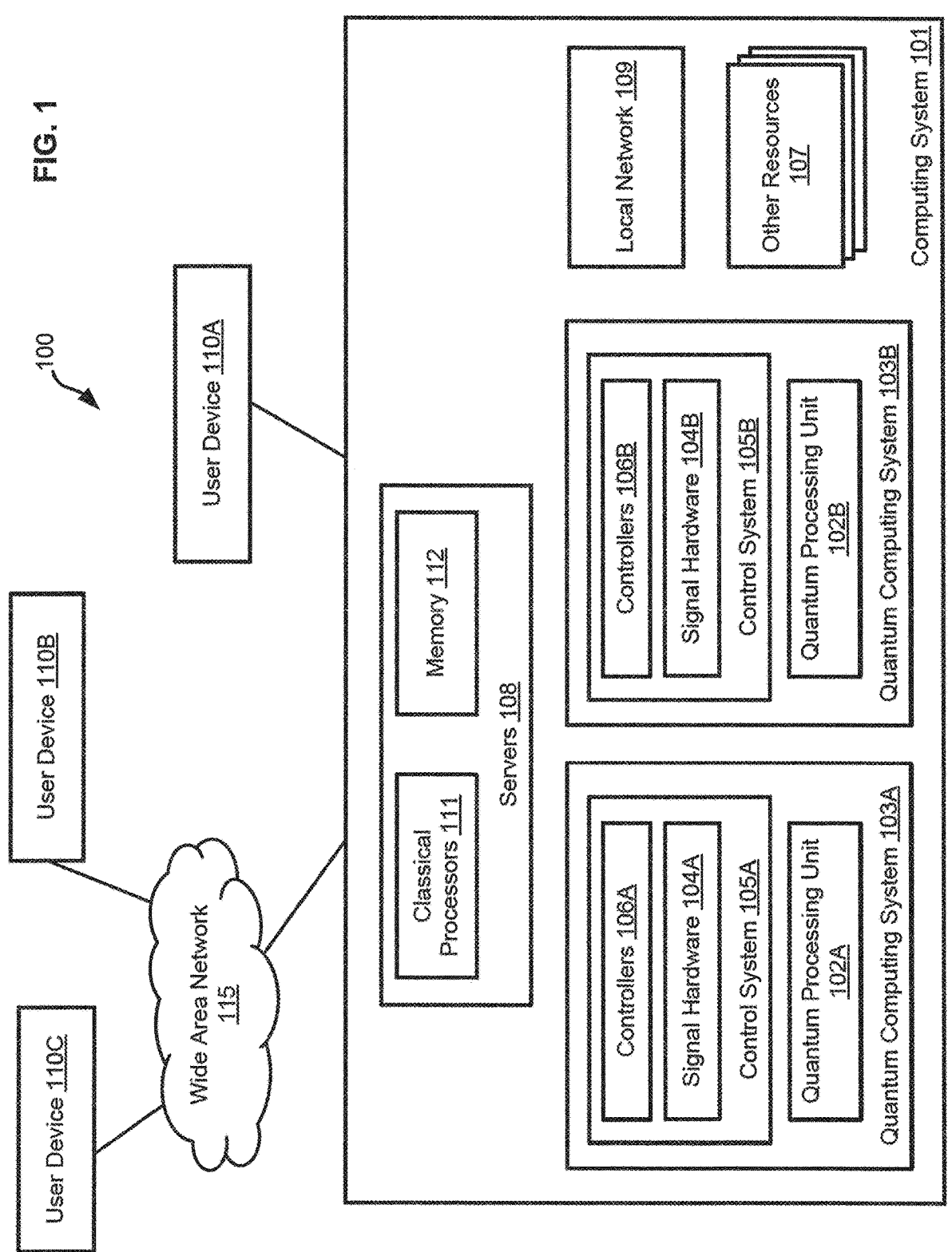
FIG. 1 is a block diagram of an example computing system.

In some aspects of what is described here, monolithic quantum-classical hybrid computing resources may be dynamically partitioned and virtualized into multiple different and independently-saleable (as a resource to a user) parcels. These parcels may comprise configurations of qubits and qubit-qubit links on one or more quantum processor units for use by users for running computer programs. This virtualization may extend from the qubit level up through the control system, and including auxiliary classical infra/compute resources for demanding hybrid workloads and jobs. An order matching system can match a demand queue to a set of available dynamically provisioned quantum-classical resources, as part of a front-end system for a user to reserve, provision, and purchase credits for, or time on, hybrid quantum-classical resources of a certain desired performance level, and for systems for monitoring and metering the use of these resources to provide an account bill or usage statement. Furthermore, in some instances, each qubit control signal may be independently controlled by a thread of computation, implemented by a CPU scheduling operations on the spooler. These threads are synchronized, either with explicit signals, or through deterministic timing. This makes it very natural to allocate a collection of control threads (i.e. those associated with a specific subset of qubits) to each user to natively support multi-tenancy of the hybrid quantum-classical computing resources.

A connected set of qubits, for example on a quantum integrated circuit, is referred to herein as a plaquette. A plaquette may also be described as a configuration of qubits and qubit-qubit links on one or more quantum computation devices. An epoch is the period of time during which a physical quantum-classical hybrid computing system is provisioned in a particular fixed configuration. The epoch time may be on the order of hours, or minutes, or in embodiments seconds or fractions of seconds.

In some instances, a computer system with quantum and classical compute resources provisionable to multiple users, may comprise: a user interface comprising a first classical computer resource configured to enable a multiplicity of users to submit a multiplicity of algorithms for a multiplicity of executions on a hybrid quantum classical computer, and to enable the multiplicity of users to interact with a plurality of results from the corresponding multiplicity of algorithm executions; and an engine coupled to the user interface, the engine comprising a second classical computer resource configured to enable scheduling the multiplicity of algorithm executions, composing a plurality of plaquette resources from an aggregate system, monitoring the availability of plaquette resources for computation, controlling a multiplicity of plaquettes for executing computational steps of the multiplicity of executions, and returning a multiplicity of execution results to a user interface, wherein a plaquette is a configuration of qubits and qubit-qubit links on one or more quantum processor units; wherein the hybrid quantum-classical computer comprises plaquettes operated as independent computational elements. Furthermore, the first classical computer may be further configured to enable the user to select a plaquette from available plaquette resources on the computer system. Furthermore, the first classical computer may be further configured to enable automated plaquette selection for the user from available plaquette resources on the computer system, the automated plaquette selection being based on automated analysis of code the user wants to run.

In some instances, a method for calculating a price for use of a configuration of qubits and qubit-qubit links on one or more quantum processor units by a user for running a computer program, may comprise: accessing a first database by a computer processor unit to collect design characteristics of the one or more quantum processor units, including inferred characteristics pertaining to the expressiveness of the one or more quantum processor units, wherein the inferred characteristics include instruction availability; accessing a second database by the computer processor unit to collect measurements of physical characteristics of the one or more quantum processor units; accessing a third database by the computer processor unit to collect characteristics of a specific user's request; and determining the price using data collected from the first, second and third databases.

In some instances, a computer system for calculating a price for use of a configuration of qubits and qubit-qubit links on one or more quantum processor units by a user for running a program, may comprise: a first database for storing design characteristics of the one or more quantum processor units, including inferred characteristics pertaining to the expressiveness of the device, wherein the inferred characteristics include instruction availability; a second database for storing measurements of physical characteristics of the one or more quantum processor units; a third database for storing characteristics of a specific user's request; and a computer processor unit for determining the price, wherein the computer processor unit is linked to the first, second and third databases for accessing input data for the determining.

In some instances, a method of auctioning quantum computing resources, may comprise: opening an auction and receiving price bids electronically submitted by users, each price bid having an order with a user desired qubit configuration, each order including a number of qubits, a configuration of qubit connectivities, a lower bound on qubit quality and one or more of a duration, a particular segment of time and a minimum duration; rejecting a specific price bid of the price bids unless the specific price bid satisfies a criteria, the criteria including one or more of: a minimum number of qubits and qubit-qubit links on one or more quantum processor units, a start time of at least a fixed time in the future, and a maximum duration; on satisfaction of one or more specific criteria, closing the auction to any new price bids; activating an order filling process, the order filling process including calculating a plurality of solutions for filling non-conflicting orders, and selecting one of the plurality of solutions according to a metric; and informing users of a status of their price bids. Furthermore, computer systems may be configured to auction quantum computing resources as described above.

In some instances, a method of matching quantum computing programs to particular subsets of qubits on one or more quantum processor units, may comprise: receiving a quantum computing program by an anonymizer unit, the anonymizer unit processing the quantum computing program to remove distinguishing characteristics to provide an anonymized quantum computing program; extracting by an adviser unit of a basic structure of the anonymized quantum computing program, the basic structure including qubit count, qubit connectivity and minimum relaxation or coherence times for qubits; comparing by the adviser unit the basic structure of the anonymized quantum computing program with structures of a plurality of quantum execution targets on the one or more quantum processor units, wherein the plurality of quantum execution targets are subsets of qubits and qubit-qubit links on one or more quantum processor units, and determining appropriate quantum execution targets using a heuristic, the heuristic including one or more of: matching native gate sets, matching plaquette and desired topologies, meeting gate activation fidelity requirements, meeting read-out fidelity requirements, and meeting coherence time or relaxation time requirements; and generating by the adviser unit of output identifying recommended quantum execution targets for the quantum computing program.

In some instances, a computer system for matching quantum computing programs to particular subsets of qubits on one or more quantum processor units, may comprise: (1) an anonymizer unit for: receiving a quantum computing program by the anonymizer unit, the anonymizer unit processing the quantum computing program to remove distinguishing characteristics of a quantum computing program for anonymizing the quantum computing program; and (2) an adviser for: extracting a basic structure of the anonymized quantum computing program, the basic structure including one or more of qubit count, qubit connectivity, native gate sets, fidelity-type measurements of native gates, readout fidelity, execution fidelity, relaxation or coherence time measurements, randomized benchmarking results, run quality of certain standard programs, historical quantum processor unit performance drifts, and coherent and incoherent noise channel measurements; comparing the basic structure of the anonymized quantum computing program with structures of a plurality of quantum execution targets, wherein the quantum execution targets are subsets of qubits and qubit-qubit links on one or more quantum computational devices, and determining appropriate quantum execution targets using a heuristic, the heuristic including one or more of: matching native gate sets, matching plaquette and desired topologies, meeting fidelity requirements, and meeting coherence time or relaxation time requirements; and generating output identifying recommended quantum execution targets for the quantum computing program.

In some instances, a method of plaquette fusion, wherein a plaquette is a configuration of qubits and qubit-qubit links on one or more quantum processor units, may comprise: receiving by a computer processor unit a plurality of plaquette requests; sorting by the computer processor unit the plaquette requests by plaquette qubit count; fusing by the computer processor unit the plaquette requests with plaquette qubit count below a predetermined integer value, X, into one or more fused plaquette requests; and submitting a request list to an allocation process, wherein the request list includes the one or more fused plaquette requests and unfused plaquette requests. Furthermore, computer systems may be configured to fuse plaquettes as described above.

In some instances, a method of plaquette allocation, wherein a plaquette is a configuration of qubits and qubit-qubit links on one or more quantum processor units, may comprise: receiving by a computer processor unit a plurality of plaquette requests; sorting by the computer processor unit requests by one or more of highest priority, highest revenue per qubit, and highest number of qubits; initializing by the computer processor unit an empty quantum processor unit (QPU) allocation; adding by the computer processor unit the highest priority plaquette request to the allocation; and determining by the computer processor unit if there are any unassigned qubits in the allocation and (a) if there are no unassigned qubits then submit the QPU allocation for the next available epoch, (b) if there are unassigned qubits then further determine if there are any unassigned requests that fit onto the unassigned qubits and (i) if no unassigned requests fit then submit the QPU allocation for the next available epoch, (ii) if unassigned requests fit then add highest priority remaining request to the allocation and repeat the determining. Furthermore, computer systems may be configured to allocate plaquettes as described above.

FIG. 1 is a block diagram of an example computing environment 100. The example computing environment 100 shown in FIG. 1 includes a computing system 101 and user devices 110A, 110B, 110C. A computing environment may include additional or different features, and the components of a computing environment may operate as described with respect to FIG. 1 or in another manner.

The example computing system 101 includes classical and quantum computing resources and exposes their functionality to the user devices 110A, 110B, 110C (referred to collectively as "user devices 110"). The computing system 101 shown in FIG. 1 includes one or more servers 108, quantum computing systems 103A, 103B, a local network 109 and other resources 107. The computing system 101 may also include one or more user devices (e.g., the user device 110A) as well as other features and components. A computing system may include additional or different features, and the components of a computing system may operate as described with respect to FIG. 1 or in another manner.

The example computing system 101 can provide services to the user devices 110, for example, as a cloud-based or remote-accessed computer system, as a distributed computing resource, as a supercomputer or another type of high-performance computing resource, or in another manner. The computing system 101 or the user devices 110 may also have access to one or more other quantum computing systems (e.g., quantum computing resources that are accessible through the wide area network 115, the local network 109 or otherwise).

The user devices 110 shown in FIG. 1 may include one or more classical processor, memory, user interfaces, communication interfaces, and other components. For instance, the user devices 110 may be implemented as laptop computers, desktop computers, smartphones, tablets or other types of computer devices. In the example shown in FIG. 1, to access computing resources of the computing system 101, the user devices 110 send information (e.g., programs, instructions, commands, requests, input data, etc.) to the servers 108; and in response, the user devices 110 receive information (e.g., application data, output data, prompts, alerts, notifications, results, etc.) from the servers 108. The user devices 110 may access services of the computing system 101 in another manner, and the computing system 101 may expose computing resources in another manner.

In the example shown in FIG. 1, the local user device 110A operates in a local environment with the servers 108 and other elements of the computing system 101. For instance, the user device 110A may be co-located with (e.g., located within 0.5 to 1 km of) the servers 108 and possibly other elements of the computing system 101. As shown in FIG. 1, the user device 110A communicates with the servers 108 through a local data connection.

The local data connection in FIG. 1 is provided by the local network 109. For example, some or all of the servers 108, the user device 110A, the quantum computing systems 103A, 103B and the other resources 107 may communicate with each other through the local network 109. In some implementations, the local network 109 operates as a communication channel that provides one or more low-latency communication pathways from the server 108 to the quantum computer systems 103A, 103B (or to one or more of the elements of the quantum computer systems 103A, 103B). The local network 109 can be implemented, for instance, as a wired or wireless Local Area Network, an Ethernet connection, or another type of wired or wireless connection. The local network 109 may include one or more wired or wireless routers, wireless access points (WAPs), wireless mesh nodes, switches, high-speed cables, or a combination of these and other types of local network hardware elements. In some cases, the local network 109 includes a software-defined network that provides communication among virtual resources, for example, among an array of virtual machines operating on the server 108 and possibly elsewhere.

In the example shown in FIG. 1, the remote user devices 110B, 110C operate remote from the servers 108 and other elements of the computing system 101. For instance, the user devices 110B, 110C may be located at a remote distance (e.g., more than 1 km, 10 km, 100 km, 1,000 km, 10,000 km, or farther) from the servers 108 and possibly other elements of the computing system 101. As shown in FIG. 1, each of the user devices 110B, 110C communicates with the servers 108 through a remote data connection.

The remote data connection in FIG. 1 is provided by a wide area network 115, which may include, for example, the Internet or another type of wide area communication network. In some cases, remote user devices use another type of remote data connection (e.g., satellite-based connections, a cellular network, a virtual private network, etc.) to access the servers 108. The wide area network 115 may include one or more internet servers, firewalls, service hubs, base stations, or a combination of these and other types of remote networking elements. Generally, the computing environment 100 can be accessible to any number of remote user devices.

The example servers 108 shown in FIG. 1 can manage interaction with the user devices 110 and utilization of the quantum and classical computing resources in the computing system 101. For example, based on information from the user devices 110, the servers 108 may delegate computational tasks to the quantum computing systems 103A, 103B and the other resources 107; the servers 108 can then send information to the user devices 110 based on output data from the computational tasks performed by the quantum computing systems 103A, 103B and the other resources 107.

As shown in FIG. 1, the servers 108 are classical computing resources that include classical processors 111 and memory 112. The servers 108 may also include one or more communication interfaces that allow the servers to communicate via the local network 109, the wide area network 115 and possibly other channels. In some implementations, the servers 108 may include a host server, an application server, a virtual server or a combination of these and other types of servers. The servers 108 may include additional or different features, and may operate as described with respect to FIG. 1 or in another manner.

The classical processors 111 can include various kinds of apparatus, devices, and machines for processing data, including, by way of example, a microprocessor, a central processing unit (CPU), a graphics processing unit (GPU), an FPGA (field programmable gate array), an ASIC (application specific integrated circuit), or combinations of these. The memory 112 can include, for example, a random access memory (RAM), a storage device (e.g., a writable read-only memory (ROM) or others), a hard disk, or another type of storage medium. The memory 112 can include various forms of volatile or non-volatile memory, media and memory devices, etc.

Each of the example quantum computing systems 103A, 103B operates as a quantum computing resource in the computing system 101. The other resources 107 may include additional quantum computing resources (e.g., quantum computing systems, quantum virtual machines (QVMs) or quantum simulators) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the servers 108 generate programs, identify appropriate computing resources (e.g., a QPU or QVM) in the computing system 101 to execute the programs, and send the programs to the identified resources for execution. For example, the servers 108 may send programs to the quantum computing system 103A, the quantum computing system 103B or any of the other resources 107. The programs may include classical programs, quantum programs, hybrid classical/quantum programs, and may include any type of function, code, data, instruction set, etc.

In some instances, programs can be formatted as source code that can be rendered in human-readable form (e.g., as text) and can be compiled, for example, by a compiler running on the servers 108, on the quantum computing systems 103, or elsewhere. In some instances, programs can be formatted as compiled code, such as, for example, binary code (e.g., machine-level instructions) that can be executed directly by a computing resource. Each program may include instructions corresponding to computational tasks that, when performed by an appropriate computing resource, generate output data based on input data. For example, a program can include instructions formatted for a quantum computer system, a quantum virtual machine, a digital microprocessor, co-processor or other classical data processing apparatus, or another type of computing resource.

In some cases, a program may be expressed in a hardware-independent format. For example, quantum machine instructions may be provided in a quantum instruction language such as Quil, described in the publication "A Practical Quantum Instruction Set Architecture," arXiv: 1608.03355v2, dated Feb. 17, 2017, or another quantum instruction language. For instance, the quantum machine instructions may be written in a format that can be executed by a broad range of quantum processing units or quantum virtual machines. In some cases, a program may be expressed in high-level terms of quantum logic gates or quantum algorithms, in lower-level terms of fundamental qubit rotations and controlled rotations, or in another form. In some cases, a program may be expressed in terms of control signals (e.g., pulse sequences, delays, etc.) and parameters for the control signals (e.g., frequencies, phases, durations, channels, etc.). In some cases, a program may be expressed in another form or format.

In some implementations, the servers 108 include one or more compilers that convert programs between formats. For example, the servers 108 may include a compiler that converts hardware-independent instructions to binary programs for execution by the quantum computing systems 103A, 103B. In some cases, a compiler can compile a program to a format that targets a specific quantum resource in the computer system 101. For example, a compiler may generate a different binary program (e.g., from the same source code) depending on whether the program is to be executed by the quantum computing system 103A or the quantum computing system 103B.

In some cases, a compiler generates a partial binary program that can be updated, for example, based on specific parameters. For instance, if a quantum program is to be executed iteratively on a quantum computing system with varying parameters on each iteration, the compiler may generate the binary program in a format that can be updated with specific parameter values at runtime (e.g., based on feedback from a prior iteration, or otherwise). In some cases, a compiler generates a full binary program that does not need to be updated or otherwise modified for execution.

In some implementations, the servers 108 generate a schedule for executing programs, allocate computing resources in the computing system 101 according to the schedule, and delegate the programs to the allocated computing resources. The servers 108 can receive, from each computing resource, output data from the execution of each program. Based on the output data, the servers 108 may generate additional programs that are then added to the schedule, output data that is provided back to a user device 110, or perform another type of action.

In some implementations, all or part of the computing environment operates as a cloud-based quantum computing (QC) environment, and the servers 108 operate as a host system for the cloud-based QC environment. The cloud-based QC environment may include software elements that operate on both the user devices 110 and the computer system 101 and interact with each other over the wide area network 115. For example, the cloud-based QC environment may provide a remote user interface, for example, through a browser or another type of application on the user devices 110. The remote user interface may include, for example, a graphical user interface or another type of user interface that obtains input provided by a user of the cloud-based QC environment. In some cases the remote user interface includes, or has access to, one or more application programming interfaces (APIs), command line interfaces, graphical user interfaces, or other elements that expose the services of the computer system 101 to the user devices 110.

In some cases, the cloud-based QC environment may be deployed in a "serverless" computing architecture. For instance, the cloud-based QC environment may provide on-demand access to a shared pool of configurable computing resources (e.g., networks, servers, storage, applications, services, quantum computing resources, classical computing resources, etc.) that can be provisioned for requests from user devices 110. Moreover, the cloud-based computing systems 104 may include or utilize other types of computing resources, such as, for example, edge computing, fog computing, etc.

In an example implementation of a cloud-based QC environment, the servers 108 may operate as a cloud provider that dynamically manages the allocation and provisioning of physical computing resources (e.g., GPUs, CPUs, QPUs, etc.). Accordingly, the servers 108 may provide services by defining virtualized resources for each user account. For instance, the virtualized resources may be formatted as virtual machine images, virtual machines, containers, or virtualized resources that can be provisioned for a user account and configured by a user. In some cases, the cloud-based QC environment is implemented using a resource such as, for example, OPENSTACK®. OPENSTACK® is an example of a software platform for cloud-based computing, which can be used to provide virtual servers and other virtual computing resources for users.

In some cases, the server 108 stores quantum machine images (QMI) for each user account. A quantum machine image may operate as a virtual computing resource for users of the cloud-based QC environment. For example, a QMI can provide a virtualized development and execution environment to develop and run programs (e.g., quantum programs or hybrid classical/quantum programs). When a QMI operates on the server 108, the QMI may engage either of the quantum processor units 102A, 102B, and interact with a remote user device (110B or 110C) to provide a user programming environment. The QMI may operate in close physical proximity to and have a low-latency communication link with the quantum computing systems 103A, 103B. In some implementations, remote user devices connect with QMIs operating on the servers 108 through secure shell (SSH) or other protocols over the wide area network 115.

In some implementations, all or part of the computing system 101 operates as a hybrid computing environment. For example, quantum programs can be formatted as hybrid classical/quantum programs that include instructions for execution by one or more quantum computing resources and instructions for execution by one or more classical resources. The servers 108 can allocate quantum and classical computing resources in the hybrid computing environment, and delegate programs to the allocated computing resources for execution. The quantum computing resources in the hybrid environment may include, for example, one or more quantum processing units (QPUs), one or more quantum virtual machines (QVMs), one or more quantum simulators, or possibly other types of quantum resources. The classical computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some examples, hybrid classical/quantum algorithms may employ a variational execution model in order to accomplish tasks such as, for example, solving combinatorial optimization problems or simulating quantum chemistry. To execute hybrid classical/quantum algorithms according to this model, the server 108 can generate an initial quantum program (e.g., based on a proposed solution to a problem, starting with an initial guess, etc.), and send the initial quantum program to quantum computer resource (e.g., the quantum computer system 103A, the quantum computer system 103B, a QVM, or a combination of them) for execution. Then, from the output of executing the initial quantum program, a classical optimizer running on the server 108 (or another classical computer resource) may update the quantum program for the next round of iteration on the quantum computer resource. Depending on the difficulty of the problem, the quality of the quantum computer resource, and other factors, the iteration loop may be repeated many times before completing the computational task. In some implementations, low-latency hybrid classical/quantum computing can be achieved, for example, when a QMI operates on a classical machine that is physically located close to a QPU.

In some cases, the servers 108 can select the type of computing resource (e.g., quantum or classical) to execute an individual program, or part of a program, in the computing system 101. For example, the servers 108 may select a particular quantum processing unit (QPU) or other computing resource based on availability of the resource, speed of the resource, information or state capacity of the resource, a performance metric (e.g., process fidelity) of the resource, or based on a combination of these and other factors. In some cases, the servers 108 can perform load balancing, resource testing and calibration, and other types of operations to improve or optimize computing performance.

Each of the example quantum computing systems 103A, 103B shown in FIG. 1 can perform quantum computational tasks by executing quantum machine instructions (e.g., a binary program compiled for the quantum computing system). In some implementations, a quantum computing system can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, a quantum computing system can operate using gate-based models for quantum computing. For example, the qubits can be initialized in an initial state, and a quantum logic circuit comprised of a series of quantum logic gates can be applied to transform the qubits and extract measurements representing the output of the quantum computation. Individual qubits may be controlled by single-qubit quantum logic gates, and pairs of qubits may be controlled by two-qubit quantum logic gates (e.g., entangling gates that are capable of generating entanglement between the pair of qubits). In some implementations, a quantum computing system can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation. Other computational regimes may be used; for example, quantum computing systems may operate in non-fault-tolerant regimes. In some implementations, a quantum computing system is constructed and operated according to a scalable quantum computing architecture. For example, in some cases, the architecture can be scaled to a large number of qubits to achieve large-scale general purpose coherent quantum computing. Other architectures may be used; for example, quantum computing systems may operate in small-scale or non-scalable architectures.

The example quantum computing system 103A shown in FIG. 1 includes a quantum processing unit 102A and a control system 105A, which controls the operation of the quantum processing unit 102A. Similarly, the example quantum computing system 103B includes a quantum processing unit 102B and a control system 105B, which controls the operation of a quantum processing unit 102B. A quantum computing system may include additional or different features, and the components of a quantum computing system may operate as described with respect to FIG. 1 or in another manner.

In some instances, all or part of the quantum processing unit 102A functions as a quantum processor, a quantum memory, or another type of subsystem. In some examples, the quantum processing unit 102A includes a quantum circuit system. The quantum circuit system may include qubit devices, readout devices and possibly other devices that are used to store and process quantum information. In some cases, the quantum processing unit 102A includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processing unit 102A. In some cases, the quantum processing unit 102A includes an ion trap system, and the qubit devices are implemented as trapped ions controlled by optical signals delivered to the quantum processing unit 102A. In some cases, the quantum processing unit 102A includes a spin system, and the qubit devices are implemented as nuclear or electron spins controlled by microwave or radio-frequency signals delivered to the quantum processing unit 102A. The quantum processing unit 102A may be implemented based on another physical modality of quantum computing.

The quantum processing unit 102A may include, or may be deployed within, a controlled environment. The controlled environment can be provided, for example, by shielding equipment, cryogenic equipment, and other types of environmental control systems. In some examples, the components in the quantum processing unit 102A operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc.

In some implementations, the example quantum processing unit 102A can process quantum information by applying control signals to the qubits in the quantum processing unit 102A. The control signals can be configured to encode information in the qubits, to process the information by performing quantum logic gates or other types of operations, or to extract information from the qubits. In some examples, the operations can be expressed as single-qubit quantum logic gates, two-qubit quantum logic gates, or other types of quantum logic gates that operate on one or more qubits. A quantum logic circuit, which includes a sequence of quantum logic operations, can be applied to the qubits to perform a quantum algorithm. The quantum algorithm may correspond to a computational task, a hardware test, a quantum error correction procedure, a quantum state distillation procedure, or a combination of these and other types of operations.

The example control system 105A includes controllers 106A and signal hardware 104A. Similarly, control system 105B includes controllers 106B and signal hardware 104B. All or part of the control systems 105A, 105B can operate in a room-temperature environment or another type of environment, which may be located near the respective quantum processing units 102A, 102B. In some cases, the control systems 105A, 105B include classical computers, signaling equipment (microwave, radio, optical, bias, etc.), electronic systems, vacuum control systems, refrigerant control systems or other types of control systems that support operation of the quantum processing units 102A, 102B.

The control systems 105A, 105B may be implemented as distinct systems that operate independent of each other. In some cases, the control systems 105A, 105B may include one or more shared elements; for example, the control systems 105A, 105B may operate as a single control system that operates both quantum processing units 102A, 102B. Moreover, a single quantum computer system may include multiple quantum processing units, which may operate in the same controlled (e.g., cryogenic) environment or in separate environments.

The example signal hardware 104A includes components that communicate with the quantum processing unit 102A. The signal hardware 104A may include, for example, waveform generators, amplifiers, digitizers, high-frequency sources, DC sources, AC sources, etc. The signal hardware may include additional or different features and components. In the example shown, components of the signal hardware 104A are adapted to interact with the quantum processing unit 102A. For example, the signal hardware 104A can be configured to operate in a particular frequency range, configured to generate and process signals in a particular format, or the hardware may be adapted in another manner.

In some instances, one or more components of the signal hardware 104A generate control signals, for example, based on control information from the controllers 106A. The control signals can be delivered to the quantum processing unit 102A during operation of the quantum computing system 103A. For instance, the signal hardware 104A may generate signals to implement quantum logic operations, readout operations or other types of operations. As an example, the signal hardware 104A may include arbitrary waveform generators (AWGs) that generate electromagnetic waveforms (e.g., microwave or radio-frequency) or laser systems that generate optical waveforms. The waveforms or other types of signals generated by the signal hardware 104A can be delivered to devices in the quantum processing unit 102A to operate qubit devices, readout devices, bias devices, coupler devices or other types of components in the quantum processing unit 102A.

In some instances, the signal hardware 104A receives and processes signals from the quantum processing unit 102A. The received signals can be generated by the execution of a quantum program on the quantum computing system 103A. For instance, the signal hardware 104A may receive signals from the devices in the quantum processing unit 102A in response to readout or other operations performed by the quantum processing unit 102A. Signals received from the quantum processing unit 102A can be mixed, digitized, filtered, or otherwise processed by the signal hardware 104A to extract information, and the information extracted can be provided to the controllers 106A or handled in another manner. In some examples, the signal hardware 104A may include a digitizer that digitizes electromagnetic waveforms (e.g., microwave or radio-frequency) or optical signals, and a digitized waveform can be delivered to the controllers 106A or to other signal hardware components. In some instances, the controllers 106A process the information from the signal hardware 104A and provide feedback to the signal hardware 104A; based on the feedback, the signal hardware 104A can in turn generate new control signals that are delivered to the quantum processing unit 102A.

In some implementations, the signal hardware 104A includes signal delivery hardware that interfaces with the quantum processing unit 102A. For example, the signal hardware 104A may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processing unit 102A. In some instances, signal delivery hardware performs preprocessing, signal conditioning or other operations on readout signals received from the quantum processing unit 102A.

The example controllers 106A communicate with the signal hardware 104A to control operation of the quantum computing system 103A. The controllers 106A may include classical computing hardware that directly interface with components of the signal hardware 104A. The example controllers 106A may include classical processors, memory, clocks, digital circuitry, analog circuitry, and other types of systems or subsystems. The classical processors may include one or more single-or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory or another type of computer storage medium. The controllers 106A may also include one or more communication interfaces that allow the controllers 106A to communicate via the local network 109 and possibly other channels. The controllers 106A may include additional or different features and components.

In some implementations, the controllers 106A include memory or other components that store quantum state information, for example, based on qubit readout operations performed by the quantum computing system 103A. For instance, the states of one or more qubits in the quantum processing unit 102A can be measured by qubit readout operations, and the measured state information can be stored in a cache or other type of memory system in or more of the controllers 106A. In some cases, the measured state information is subsequently used in the execution of a quantum program, a quantum error correction procedure, a quantum processing unit (QPU) calibration or testing procedure, or another type of quantum process.

In some implementations, the controllers 106A include memory or other components that store a quantum program containing quantum machine instructions for execution by the quantum computing system 103A. In some instances, the controllers 106A can interpret the quantum machine instructions and perform hardware-specific control operations according to the quantum machine instructions. For example, the controllers 106A may cause the signal hardware 104A to generate control signals that are delivered to the quantum processing unit 102A to execute the quantum machine instructions.

In some instances, the controllers 106A extract qubit state information from qubit readout signals, for example, to identify the quantum states of qubits in the quantum processing unit 102A or for other purposes. For example, the controllers may receive the qubit readout signals (e.g., in the form of analog waveforms) from the signal hardware 104A, digitize the qubit readout signals, and extract qubit state information from the digitized signals. In some cases, the controllers 106A compute measurement statistics based on qubit state information from multiple shots of a quantum program. For example, each shot may produce a bitstring representing qubit state measurements for a single execution of the quantum program, and a collection of bitsrings from multiple shots may be analyzed to compute quantum state probabilities.

In some implementations, the controllers 106A include one or more clocks that control the timing of operations. For example, operations performed by the controllers 106A may be scheduled for execution over a series of clock cycles, and clock signals from one or more clocks can be used to control the relative timing of each operation or groups of operations. In some implementations, the controllers 106A may include classical computer resources that perform some or all of the operations of the servers 108 described above. For example, the controllers 106A may operate a compiler to generate binary programs (e.g., full or partial binary programs) from source code; the controllers 106A may include an optimizer that performs classical computational tasks of a hybrid classical/quantum program; the controllers 106A may update binary programs (e.g., at runtime) to include new parameters based on an output of the optimizer, etc.

The other quantum computer system 103B and its components (e.g., the quantum processing unit 102B, the signal hardware 104B and controllers 106B) can be implemented as described above with respect to the quantum computer system 103A; in some cases, the quantum computer system 103B and its components may be implemented or may operate in another manner.

In some implementations, the quantum computer systems 103A, 103B are disparate systems that provide distinct modalities of quantum computation. For example, the computer system 101 may include both an adiabatic quantum computer system and a gate-based quantum computer system. As another example, the computer system 101 may include a superconducting circuit-based quantum computer system and an ion trap-based quantum computer system. In such cases, the computer system 101 may utilize each quantum computing system according to the type of quantum program that is being executed, according to availability or capacity, or based on other considerations.

Figure 2:
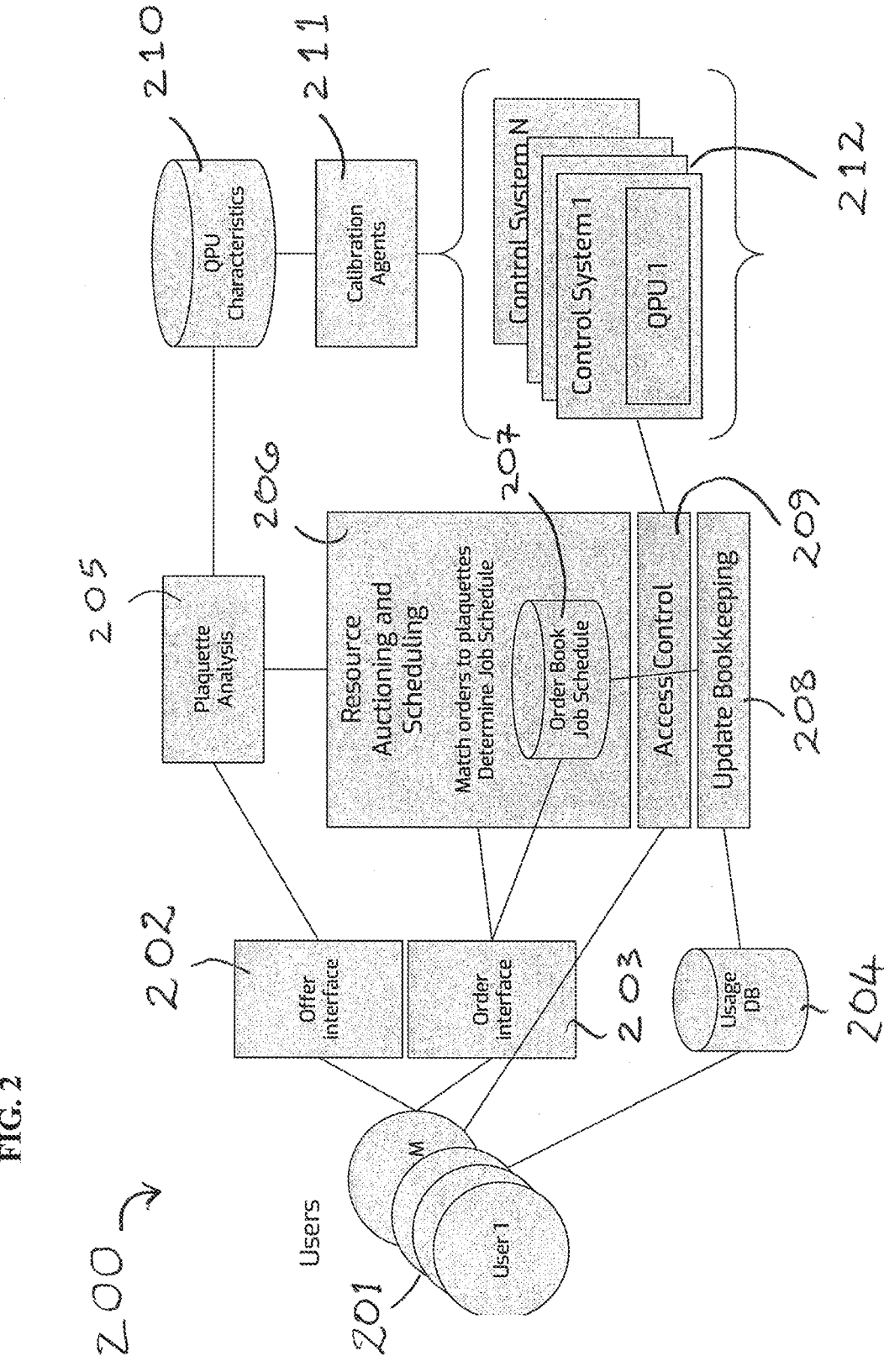
FIG. 2 is a block diagram of a first example of a computing system including a QPU resource monitoring, auctioning and scheduling subsystem.
Figure 3:
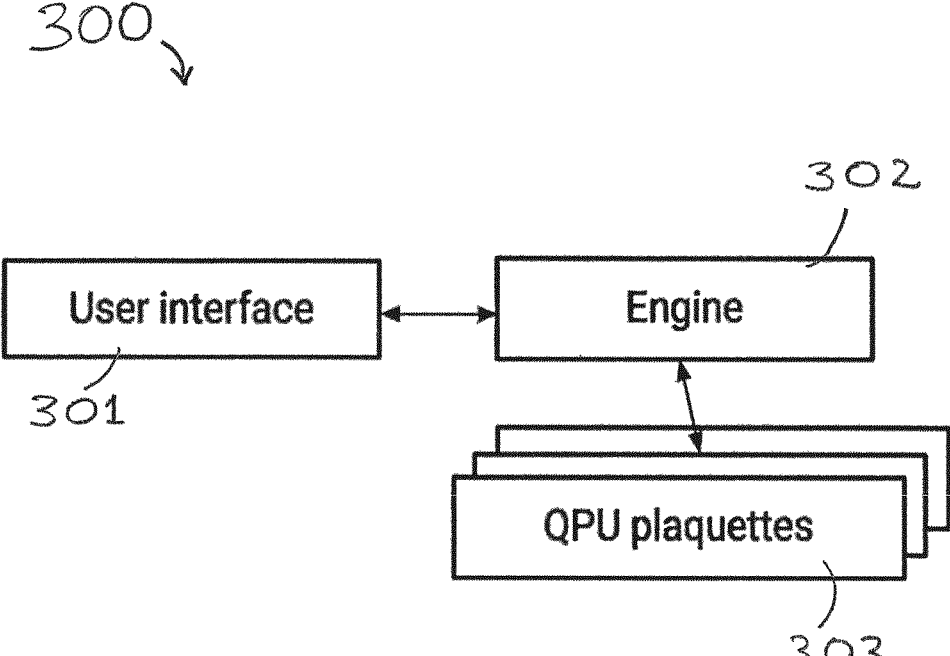
FIG. 3 is a high level block diagram of a second example computing system including a QPU resource monitoring, auctioning and scheduling subsystem.

FIGS. 2 & 3 are schematic representations of high level block diagrams 200, 300 of example computing systems including QPU resource monitoring, auctioning and scheduling subsystems. In some implementations, elements of the example computing environment 100 shown in FIG. 1 can be cast with an architecture illustrated by the example systems 200, 300 & 400 shown in FIGS. 2, 3 & 4, respectively. The example system 200 shown in FIG. 2 provides users 201 access to the QPU control system 212 via the cloud, the internet, or some other communication link, which is comparable to user device 110 access to quantum computing systems 103 in FIG. 1. FIG. 2 also includes plaquette analysis module 205 and resource auctioning and scheduling system 206, which may be provided on servers 108 in FIG. 1.

Hardware and software systems for virtualized quantum-classical computing are described as follows with reference to the figures. The system capabilities and core concepts that underpin the virtualization of quantum-classical compute systems and their provisioning to multiple simultaneous users are covered starting from the qubit level (for example, the quantum integrated circuit) and including: the dynamical creation and definition of qubit plaquettes with specific performance attributes and characteristics; the hosting on a single QPU multiple user instances connected to those plaquettes and the provisioning of classical resources to support each such instance in a quantum classical architecture, as demanded by the specific job or user.

In some embodiments a quantum computing system may be configured such that one or more of the following apply: the number of concurrent computations can be larger than one; concurrent computations are logically independent instances of hybrid quantum-classical algorithms; the number of concurrent computations is larger than the number of aggregated quantum computation resources; one aggregated quantum resource is an entire processor of superconducting qubits (likewise for pother qubit types including ions, spins, nitrogen vacancies (NVs), etc.); the time ordering of concurrent execution of computations is managed by a resource manager; the apportionment of multiple partial resources (plaquettes) from a single aggregate quantum system for computation is managed by a resource manager; the constitution and/or properties of multiple partial resources (plaquettes) apportioned from a single aggregate quantum system for computation may be modified by a resource manager.

Users want to run programs on a quantum processor unit (QPU), but often their programs far underutilize the total collection of quantum resources available. Understanding the resource utilization of individual programs, together with the resource subset availability on the QPU, user's jobs can be matched with subsets of the available resources to most effectively utilize the QPU. A representation of an example hybrid quantum-classical computing system 200 with subsystems for parceling quantum resources to multiple users 201 is provided in FIG. 2. Users 201 are the external customers for resources. Through the offer interface 202 users can view the available QPU resources including information about embeddable plaquettes and qubit qualities; historic price information may also be provided. On the order interface 203 users can submit an order, or bid, for a certain number of epochs running on a plaquette of a certain size, connectivity and quality of qubits. In the case of an auction-based process, the order interface allows the user to see the success of previously submitted bids and to re-submit a new bid for the next round.

The resource, auctioning and scheduling subsystem 206 provides the following functions: matches orders to available resources and their usage/access schedule (order book job schedule 207); determines the pricing of plaquettes; accepts or rejects orders submitted by users; manages temporal access control to QPU resources (access control 209); and handles the bookkeeping of consumed epochs on resources (update bookkeeping 208). A usage database 204 stores the record of consumed epochs on plaquettes for each user along with the corresponding price. A plaquette analysis module 205 tracks the properties of available QPU plaquettes over time (across recalibrations of the QPU). A QPU characteristics database 210 stores the quality metrics of each qubit and gate on each QPU. Calibration agents 211 periodically execute recalibration jobs on each qubit of each QPU 212, measure the current performance, and provide the data to the QPU characteristics database 210. The control systems and their connected QPUs 212 include both the classical and quantum compute resources as well as everything required for the interaction of the hybrid resources.

FIG. 3 is a high level block diagram of a second example computing system 300 including a QPU resource monitoring, auctioning and scheduling subsystem. System 300 comprises a user interface 301, an engine 302 and QPU plaquettes 303. The user interface 301 comprises a classical computer resource configured to enable: a multitude of users to compose a multitude of algorithms, compile and/or submit the multitude of algorithms for a multitude of executions, receive and/or interact with a plurality of results from the multitude of algorithm executions, and receive and/or interact with information about the system. Some or all of these user interactions may be simultaneous.

The engine 302 comprises a classical computer resource configured to enable: scheduling a multitude of algorithm requests; composing a multitude of plaquette resources from an aggregate system; monitoring and/or managing the availability of plaquettes for computation; instructing a multitude of QPU plaquettes on a plurality of computation steps; and returning a multitude of execution results. The engine 302 may include a database for storing information.

The QPU plaquettes 303 comprise multiple quantum-classical hybrid systems operated as independent computational elements, which may be parts of an aggregate system. The QPU plaquettes are configured to allow a multitude of computation instructions to be concurrently executed across a plurality of QPU plaquettes. The QPU plaquettes may have features at physical or logical boundaries between resources which reduce coupling between plaquettes, as described in more detail below.

Figure 4:
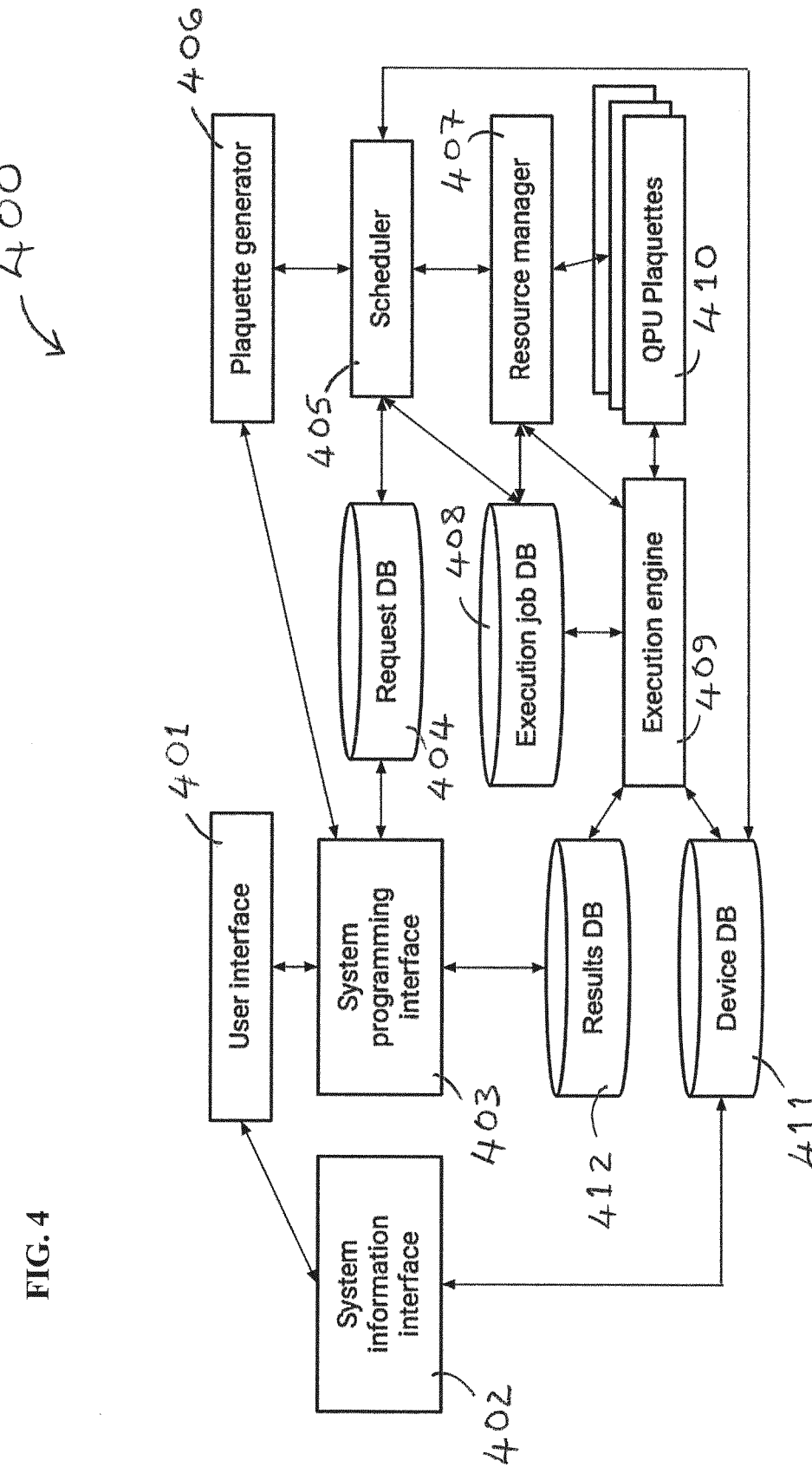
FIG. 4 is a detailed block diagram of the second example computing system of FIG. 3.

FIG. 4 is a detailed block diagram of the example computing system of FIG. 3; hybrid quantum-classical computing system 400 comprises the following elements. A User interface 401 comprises: a web interface; a command line (e.g. SSH) interface; a GUI interface and/or a multitude of visualizations; and provides access a system information interface 402 and system programming interface 403. The system information interface 402 provides: visualizations of available resources, including information about potential plaquettes, benchmark information on the plaquettes and component qubits, system availability and scheduling. The system information interface may be periodically updated, for instance by queries to the device database 411.

The system programming interface provides access to features such as software packages, quantum computing simulation capabilities, compilation capabilities, error checking and/or debugging capabilities, and resource estimators, such as a plaquette generator 406 and/or schedule estimates, for example by providing access to a request database 404. The request database is configured to store requests from a multitude of users, and organize the requests by one or more of the required resources, requested time for use of QPU and/or duration, etc. The scheduler 405 is configured to optimize: parcel resource allocation of requests, time ordering of requests including concurrent execution of requests, and timing of recalibration, all given some objective function(s). For example, the timing of recalibration may be optimized to maximize available run time for jobs, optimized to provide anticipated performance at or above a fixed criteria based on historical performance (which may be recalibration at fixed time intervals), optimized to make system available for highest priority jobs, etc. Information about the system may be used for these optimizations, for example system benchmarks (available from device database 411 and/or current (or future) availability (available from resource manager 407).

Plaquette generator 406 is configured to: encode the properties of an aggregate quantum resource, such as its connectivity and/or benchmarks, as a graph network to represent potential plaquettes; solve for suitable graph configurations for a multitude of concurrent algorithm requests; consider a weighted graph distance metric that includes benchmarks in the weights; and compute properties of plaquettes such as route problems, like minimum spanning tree and/or shortest path and/or longest path and/or statistical properties of graphs. The generator 406 may be employed by users through user interface 401 or programming interface 403.

Resource manager 407 is configured to: features: monitor the QPU for available resources; assign QPU resources to "unavailable" based on specified criteria, such as poor fidelity, recalibration, etc.; assign QPU resources to "available"; and instruct the formation of plaquettes from a pool of QPU resources. Note that parcels are re-constituted, if necessary, for a given execution. Plaquette formation may include hardware reconfiguration, such as: bias adjusted for tunable couplers to cause more/less coupling between qubits; room temperature switch activated to change signal paths; adjustments to control parameters (e.g. modular control IP). Furthermore, plaquette formation may include software reconfiguration, such as: memory register addresses may be set; CPU threads may be created or deleted; virtual machine instances may be created or deleted. Furthermore, memory addresses that translate virtual resources to physical resources may be set. Furthermore, the resource manager may be embedded in the control system of the aggregate quantum computer, for instance in a host computer or on an FPGA.

Execution job database 408 may comprise a time-ordered set of executions for the QPU and may be implemented as a stack (queue). Furthermore, the database may be embedded in the control system of the aggregate quantum computer, for instance in a host computer or an FPGA. Furthermore, the database may be re-ordered by the scheduler 405.

Execution engine 409 is configured to send instructions to a multitude of QPU parcels and receive results from a multitude of QPU parcels.

The QPU plaquettes/parcels 410 may comprise: conventional information processing capabilities; conventional, heterogeneous processing capabilities (e.g. GPUs); sufficient control system to operate a parcel of quantum resources. The QPU parcels may be characterized by: a static relationship between control system and quantum resource (i.e. fixed signal paths); or a dynamic relationship between control system and quantum resource (i.e. switches). The QPU parcels may be configured to enable adjusting control parameters when re-allocation of parcelling is indicated by the resource manager 407. Note that a pool of QPU parcels may be considered aggregated if run-time execution information and/or quantum information could be exchanged between them.

Device database 411 may be configured to: store results from benchmarking tests on a multitude of parcels; store results from selected executions on a multitude of parcels; include meta-information about devices in the system, for instance device connectivity and/or status. Results database 412 may be configured to: store the results of executions from a multitude of QPU parcels; organize results according to information pertaining to the job request.

Figure 5:
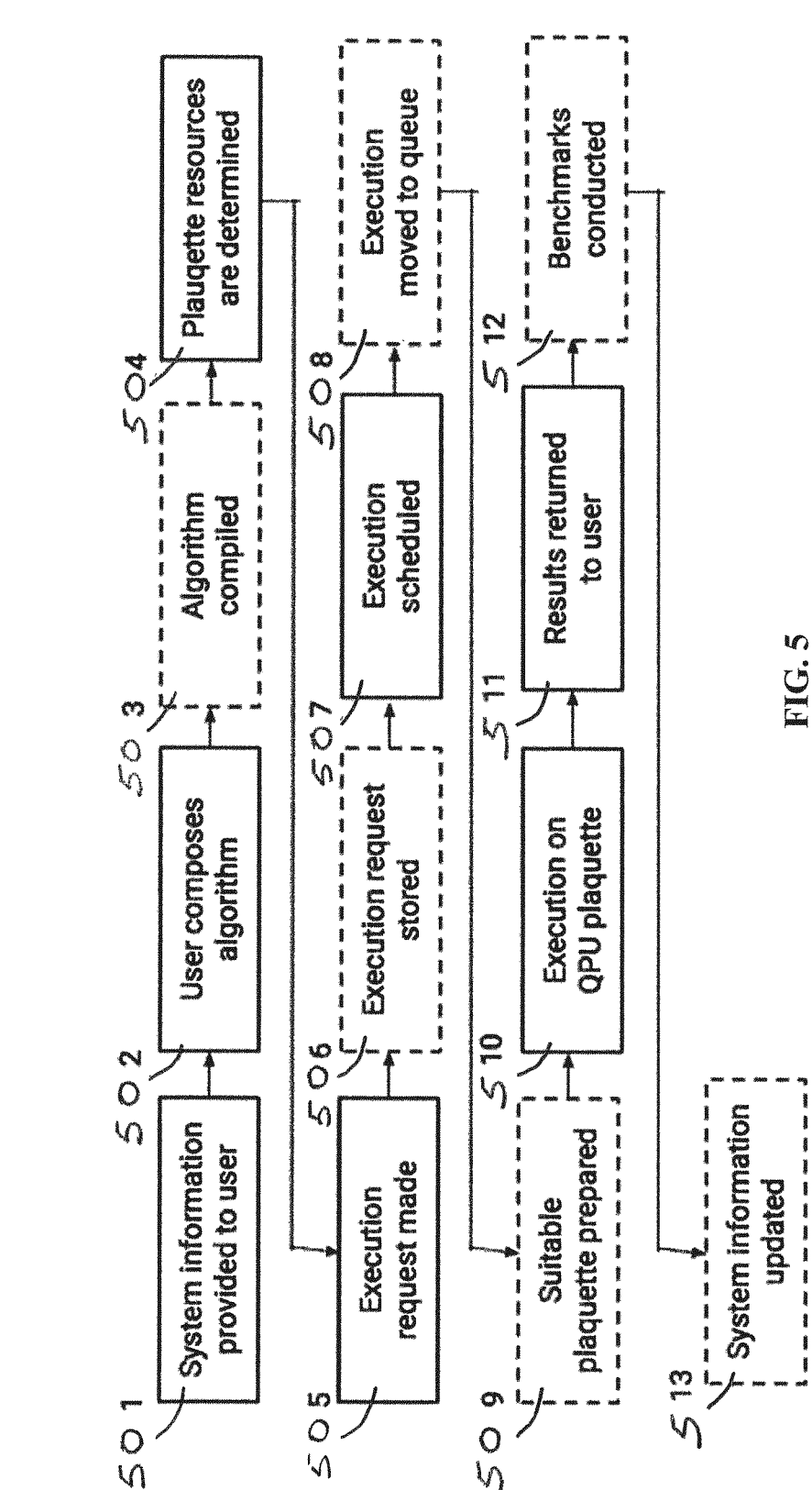
FIG. 5 is a flow chart showing example operation of the second example computing system of FIG. 4.

FIG. 5 is a flow chart showing an example operation of the computing system of FIG. 4. Information may be provided to the user (501) through a user interface (401) where the data may include: information about potential plaquettes; information about benchmarks; information about system availability; and information about scheduling. Relevant data may be stored in a database (411). Historical data and/or trends may be stored and/or accessed. Data may be stored in a relational database. Data may be average and/or expected values. Data may include statistical confidence intervals. Information may be provided to the user through a system information interface (402) and may include: visualizations, for instance of benchmark results; representations of quantum device connectivity, e.g. graphical; and information about the results or expected results of algorithms run on the system and/or on plaquettes. The user may interact with this interface through a web browser and/or GUI and/or API.

A user may compose an algorithm (502) through a user interface (401) and/or through a system programming interface (403): The user may utilize pre-developed software packages to compose an algorithm, for example: Rigetti's open source Grove package contains a multitude of known quantum algorithms implemented in Quil. These may be made available to users, through a gamming interface. The users may incorporate these as subroutines and/or modify them as they determine. Furthermore, third parties may develop software that is made available to users through the system programming interface (403). The user may utilize simulation capabilities to compose an algorithm. For example, Rigetti's simulator, the Quantum Virtual Machine (QVM) may be accessible through the system programming interface (403). Users may simulate all or parts of their algorithm with the QVM to test for errors and/or expected behavior. The user may utilize checking and/or debugging capabilities. For example: the interface may allow for checking for compile time errors such as undefined variables and/or operations; the interface may allow for checking of gate depth constraints; the interface may allow for checking of conventional hardware constraints such as recursion limits and/or potential run-time errors; the interface may allow for debugger modes, which may include for instance inspection of breakpoints and thread execution state.

The algorithm may be compiled (503) through a system programming interface (403). The compilation may include: a translation of an algorithm to a set of machine executable instructions, for instance a set of executable gates and readout operations; translation of an algorithm and/or instructions to another algorithm and/or instructions, for instance reducing the number of gate operations required to approximately implement a unitary to optimize the algorithms efficiency; providing information about potential plaquettes available to perform the algorithm, for instance their connectivity, and/or available gate-set, and/or benchmarks; and providing information about other compilations, for instance if a requested subroutine has been compiled for use with a previous algorithm.

The plaquette resources required for an algorithm may be determined (504) by the user and/or compiler at a system programming interface (403), and/or by a scheduler (405). The information used to determine resources may include information stored, for instance in databases, as a few examples: information about the properties of plaquettes may be stored in a device database (411), and/or information about other execution requests may be stored in a request database (404), and/or information about resource availability may be stored in an execution job database (408). A user may submit information that affects the requirements for resources, for instance number of qubits and/or lattice type and/or performance and/or specific plaquette configurations. A multitude of constraints and objective functions may be provided to a plaquette generator (406) that may determine optimized mappings between resource/algorithm request and potential resources.

The execution of a specific computation may be requested (505) on the system by the user through a system programming interface (403). A requested execution job may be stored (506) by the system, for instance by a database such as request DB (404).

A requested execution job may be scheduled (507) by a scheduler (405). The scheduler may make use of a plaquette generator (406) to map multiple requests for resources into a multitude of epochs. For example, it may be determined that two jobs can be placed on the system concurrently (as one epoch) if they are determined to be compatible with non-overlapping plaquette resources. The Scheduler may access information about a multitude of requests in the request database (404) and/or in the execution job database (408) to determine schedules of epochs. The Scheduler may access information about the availability of computational resources, for instance by communication with a resource manager (407). The Scheduler may update users, for instance through the device database (411) and/or the request database (404) with information regarding availability of resources and/or information about the expected timing of a multitude of executions.

An execution job and/or an epoch of jobs may be stored in a memory (508) such as job execution database (408), that may include scheduling information. The execution job and/or epochs may be stored in a queue or stack data type. The execution job and/or epochs may be stored in a low latency memory cache, for instance local to the control system.

A multitude of plaquettes of hybrid quantum-classical resources may be prepared (509) for the execution of one or more epochs of jobs, by, for instance, a resource manager (407) or an execution engine (409). Information about the desired configuration may be taken from the execution job database (408), for instance by querying for the next epoch in a sorted queue or stack. The resource manager (407) may indicate the availability of system resources with respect to the current job and future schedules.

An epoch may be executed (510) on the system, for instance using a multitude of QPU plaquettes (410). Results of a multitude of executions and associated information may be returned (511), for instance to a database such as a results database (412). Meta-information about an execution job within an epoch, such as user information, may determine how the results are stored by the system, for instance memory location. Results may be post-processed or otherwise analyzed by the system, for instance by a multitude of QPU plaquettes (410) or the execution engine (409). Results may be stored in the device database (411), for instance, if the results are pertinent to benchmarks or otherwise understanding aspects about the system and/or specific QPU plaquettes (410). A user may be able to access results from executions, for instance the execution they requested, through a system programming interface (403).

A multitude of epochs may be executed to evaluate benchmarks (512) or otherwise provide information about the system and/or specific QPU plaquettes (410) intermittently. The execution information about these epochs may include instructions and/or analysis and/or information about recalibration. The execution information about these epochs may be stored in a database such as the execution job database (408) and/or they may be stored and/or managed by a resource manager (407).

System information may be updated (513) as the result of new information about the system, for instance in response to a change of contents in the device database (411). Such updates may result in changes to the system information interface (402).

Figure 6:
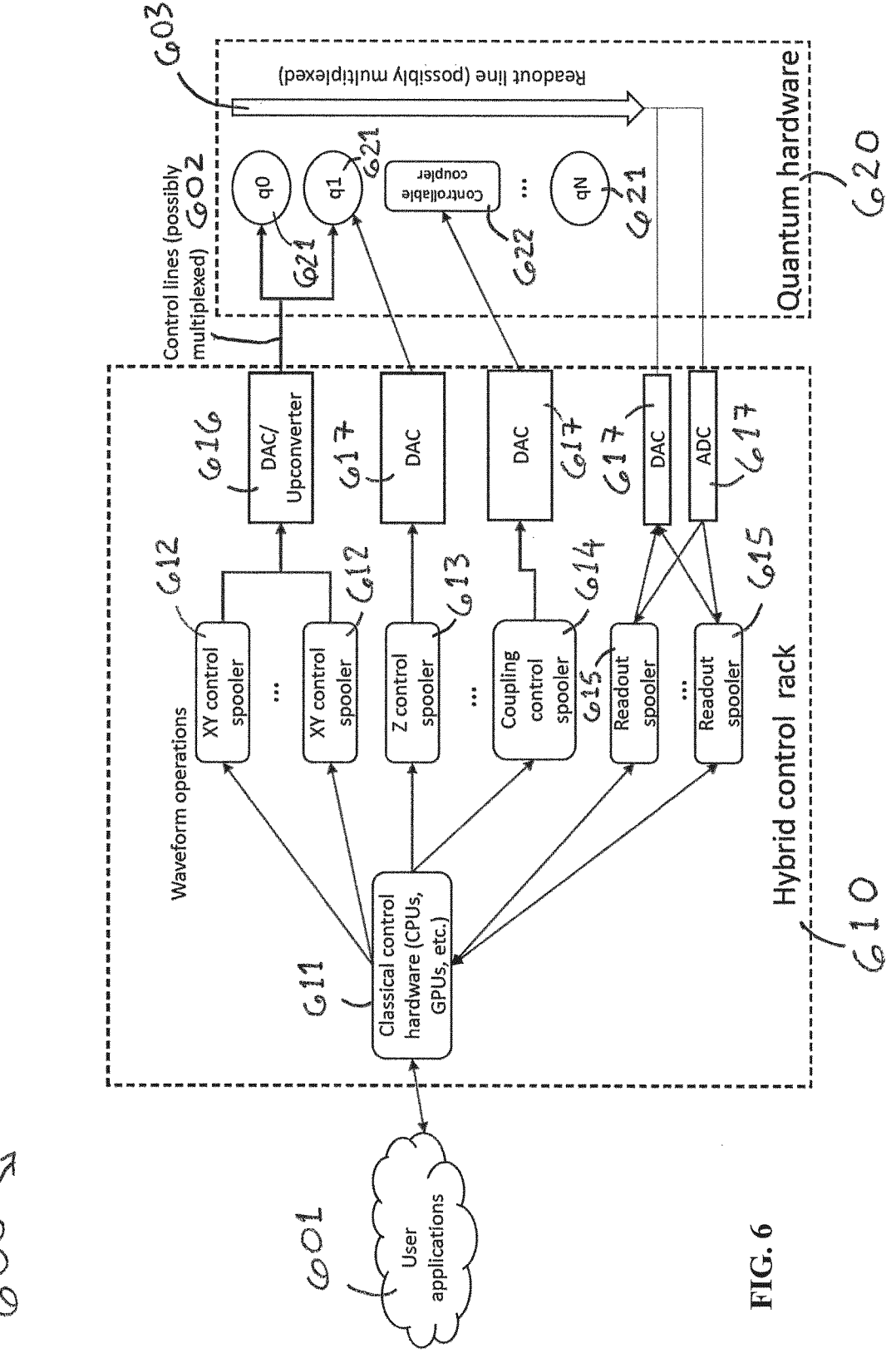
FIG. 6 is a representation of an example control system architecture for virtualized hybrid quantum classical computing.

An example control rack architecture 600 for full virtualized hybrid classical quantum computing is shown in FIG. 6. The control rack architecture 600 comprises user applications 601 (provided from the cloud, for example), control lines 602 (which may be multiplexed), readout lines 603 (which may be multiplexed), a hybrid control rack 610 and quantum hardware 620. The hybrid control rack comprises classical control hardware 611 (such as CPUs, GPUs, etc.), XY control spoolers 612, Z control spoolers 613, coupling control spoolers 614, readout spoolers 615, (612-615 being for waveform operations), DAC/Upconverters 616, and DACs 617. The quantum hardware 620 comprises: qubits 621 and controllable couplers 622.

The control system may include one or more of the following. Hierarchical architecture within the control system, with abstraction/virtualization within respective layers. Constrain high-RAM allocations to larger qubit plaquettes. For each qubit, one or more control signals is provided to realize 1Q 2Q or nQ gates, as well as a signal path to read the state of the qubit. The control and readout signals for multiple qubits may be multiplexed, such as RF multiplexing on a transmission line, or optical multiplexing on a fiber. Each control signal is driven by a waveform engine; the waveform engine takes parameters for a gate signal (shape, amplitude, frequency, phase offset, start time) and produces the commanded signals. Readout is accomplished by readout engines consisting of a waveform engine for generating the interrogation signal and an analysis engine for determining the result of the qubit measurement.

Commands for the waveform and readout engines (612-617) are provided by the classical compute functionality of the hybrid classical/quantum processor 611 (the "sequencers"). Soft processor(s) may be on the same FPGA as the waveform engine logic and hard processor(s) may be integrated on the same die as the FPGA/ASIC as the waveform engine. Processors are connected to the waveform engine via a high-bandwidth, low-latency (very much less than the coherence time) communications link/bus. Results from readout engines are distributed to all sequencers that are associated with a plaquette to enable hybrid computing. A mechanism to determine the allocation of physical classical resources shared between sequencers (i.e. RAM physically connected to a group of sequencers). If a program requires more RAM, it may prevent other programs to run on sequencers that share the same RAM resource, so the user could be charged more to run that program. In some embodiments there is a one-to-one mapping between sequencers and gate signals, so these can be readily partitioned into plaquettes.

Readout signals may be multiplexed, for example 8:1. Each qubit readout is controlled by a single readout transmit sequencer and a readout receive sequencer. The signals for eight transmit sequencers, for example, can be added to be combined onto a single readout line. The resulting received waveform is distributed to each of the receive sequencers, each of which uses a matched filter to separate out the readout result from the associated qubit, while rejecting interference from any other readout operations which might be being performed simultaneously. The size of a plaquette could be set to be a multiple of the largest number of multiplexed signals controlled by a single sequencer (in this example 8Q, hence plaquettes would be up to n*8Q). In this case, the plaquettes would also be physically constrained to include qubits in corresponding 8Q chunks. For example, a plaquette of 15 qubits might span 3 octagons and hence require an allocation of 3 multiplexed readout lines in this simple solution. Multiplexed readout or signal lines could be serviced by multiple sequencers running separate programs. Readout requests for (two) independent plaquettes that share a multiplexed readout or gate signal can be staggered by the compiler to avoid interference between programs running on the (two) plaquettes. Readout by multiple sequencers would still need to be coordinated by the compiler, or the compiler can allow simultaneous multiplexed access if the specific readout/gate signals are known (from characterization measurements) to not interfere with each other significantly. A method can be provided to guarantee that simultaneous multiplexed access does not occur; this might incur a higher price for the user.

The hybrid classical quantum system can include a low-latency means of communicating between sequencers, particularly readout results. At compile time, the amount of low-latency traffic generated by a program can be calculated and provides another billable metric. In some implementations, if program A and program B are running simultaneously, and program A requires a lot of iSWAPs, program B may suffer increased latency waiting for the bus to be available to transfer qubit measurement results. Guaranteed latency metrics could be another billable item. In the preceding example, if the user running program B is willing to pay for the absolute lowest latency, the low-latency messages from program B could be prioritized over the onslaught of messages from program A.

A description of an example embodiment of a multiprocessor for hybrid quantum-classical computing with virtualization support in hardware is provided. The following describes how the task of mapping hybrid quantum-classical programs (jobs) to available hardware can be performed by the hardware itself using concepts from classical computer virtualization.

As an example, if a user submits a program to be run on four interconnected qubits, that program could start on four specific qubits (call them q0-q3). During the course of execution, there will be periods of time when the qubit states are not classical (i.e in a superposition of states, or entangled), and periods after the qubits states have been measured, and the states are all classical. When the states are all classical, the virtualization manager ("hypervisor") could decide to migrate the program to a set of four other qubits (call them q10-q13), provided the connectivity between the qubits is sufficient for the desired program. This would allow programs to make efficient use of the classical and quantum resources, by letting the hardware reallocate resources as jobs are submitted.

There are two aspects of this approach which are carefully considered. The first is that the state of each qubit ("clean": classical 0, classical 1; or quantum indeterminant, "dirty" in the language use below) is propagated throughout the system with low latency. This allows the hypervisor to know which qubits are not immediately in use and thus could potentially be reallocated. It also allows any running program which might have control flow operations that depend on the readout result of a qubit to have the information necessary to execute that control flow. A simple, specific, example of this would be using the readout result to decide if a gate should be played to reset the state of a qubit. This aspect is represented by the Qi state and hygiene mask discussed below with reference to FIG. 9.

The second aspect is that the quantum gate instructions need to be available with extremely low latency to all the individual control processors for each qubit. Continuing with the example above, if the users program performs a gate on a qubit, and that gets allocated to q0 for one iteration, but then is reallocated to q10 for another iteration, the control system for q10 needs to have that instruction. This aspect is represented by the Qi unitary command discussed in more detail below. The translation table discussed below is what holds the current mapping of programs to qubit resources. The programs are written to use "virtual" qubit addresses, which this table then translates to physical qubits.

The description below encompasses a range of system scales, from the case where all qubits could be controlled by a single classical compute chip, so that the low-latency shared memory could be implemented as a multi-port memory register, to cases where communication between chips, boards, and chassis are needed. In these later cases, tradeoffs between interconnect density and latency are considered.

The hybrid-quantum supercomputer described below with reference to FIGS. 7-14 is an example of a system of the present invention according to some embodiments.

Figure 7:
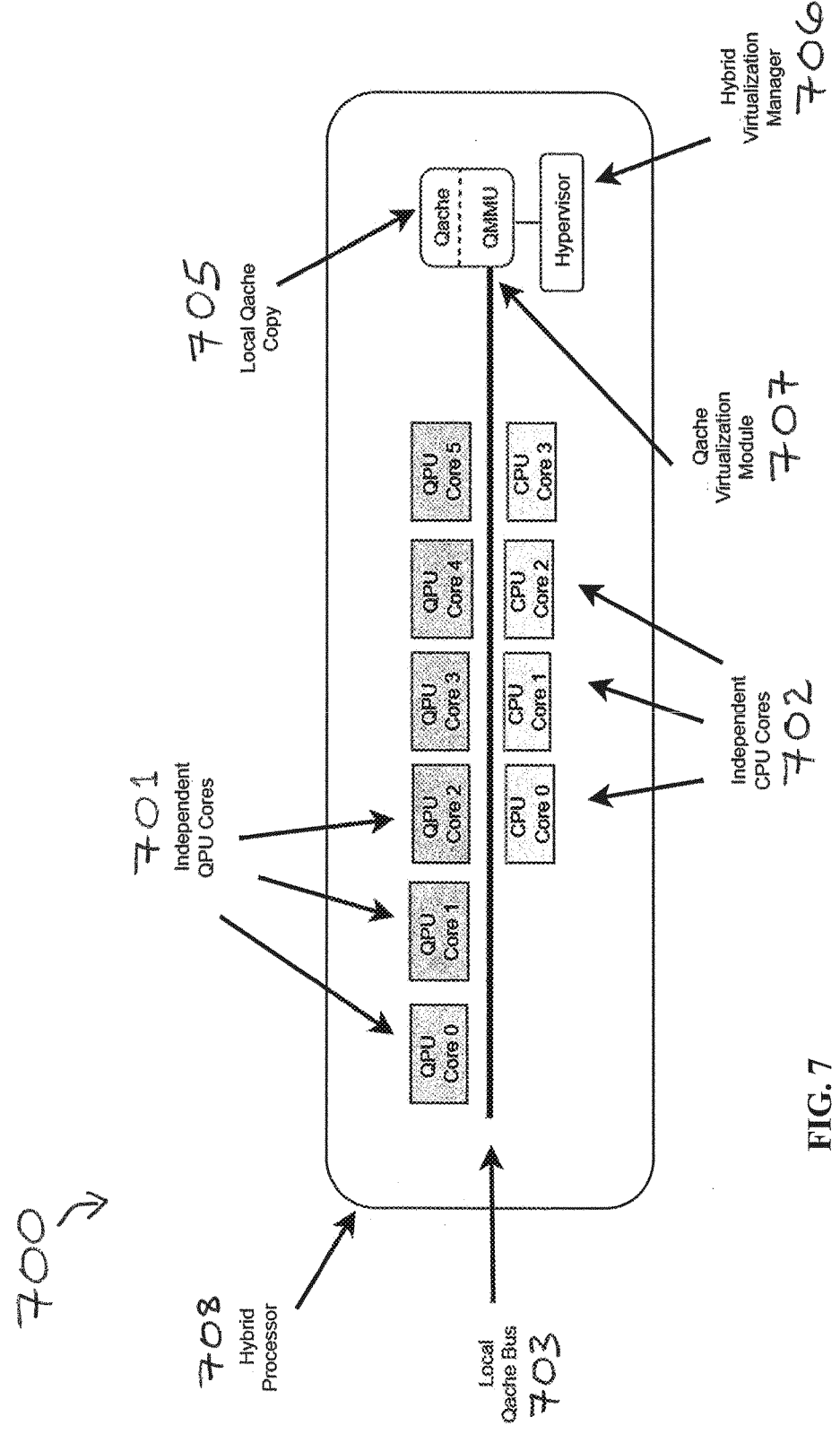
FIG. 7 is a representation of an example virtualizable hybrid quantum-classical processor unit.
Figure 8:
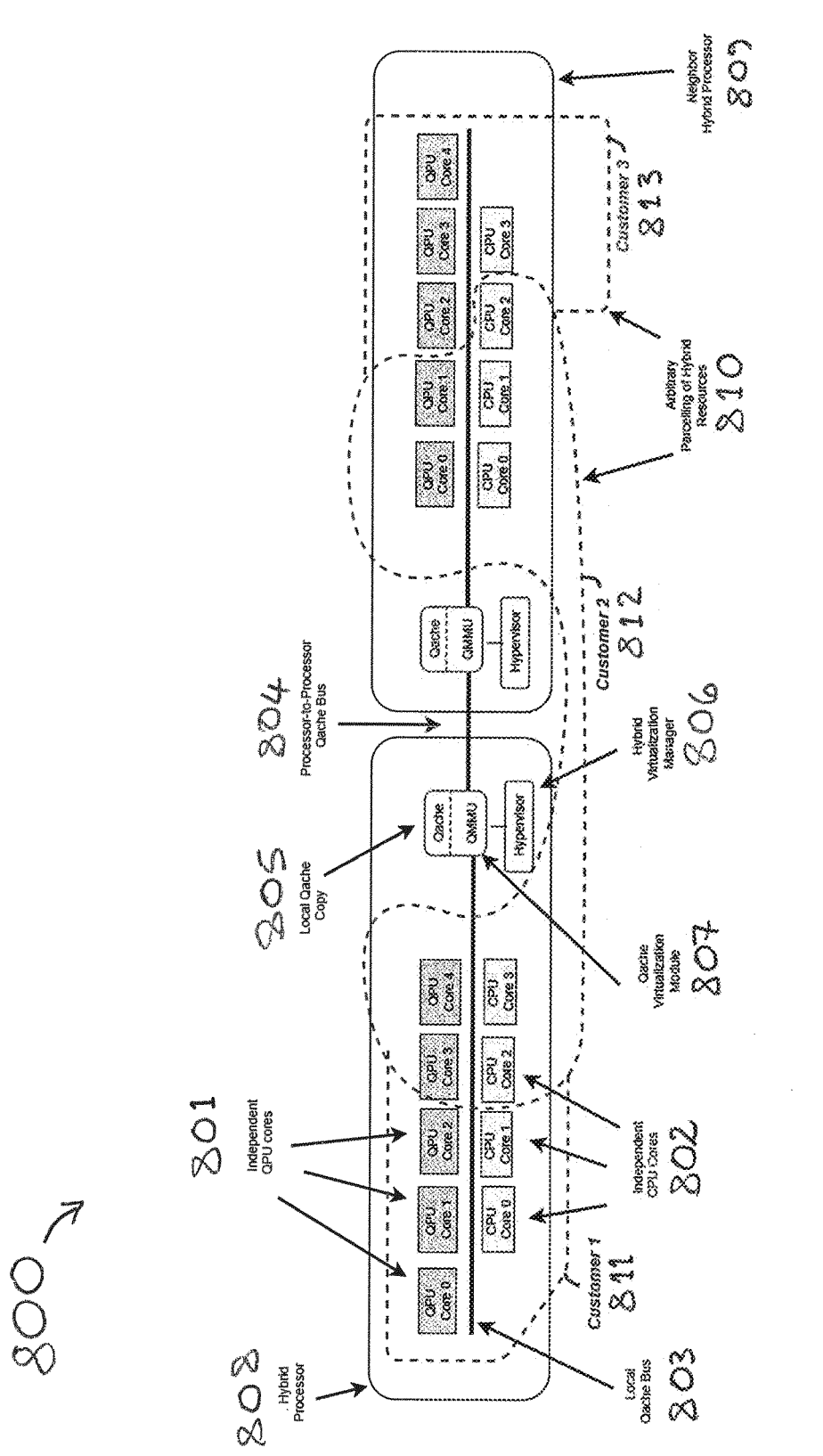
FIG. 8 is a representation of an example of two coherent virtualizable hybrid quantum-classical processor units.

FIG. 7 is a representation of an example virtualizable hybrid quantum-classical processor unit, and FIG. 8 is a representation of an example of two coherent virtualizable hybrid quantum-classical processor units. The processor units 700, 800 comprise: independent QPU cores 701, 801 where each box in the figure corresponds to a thread of execution for an array of N qubit(s); independent CPU cores 702, 802 where each box corresponds to a classical thread of execution (which may be processing an instance, doing minimum weight perfect matching, etc.); local Qache buses 703, 803 which are tightly coupled memory shared between all the QPU and CPU cores on their corresponding hybrid processing units (HPUs); processor-to-processor (system) Qache buses 804, 904 which enable coherency of the hybrid shared cache across multiple hybrid processing units; local Qache copies 705, 805, 905, which are cache copies local to a given hybrid processing unit that is managed by that hybrid processor's Quantum Memory Management Unit (QMMU) and holds coherent copies of all hybrid classical variables and state readout for the corresponding entire system; hybrid virtualization managers (hypervisors) 706, 806, 906 which load and manage jobs for execution, and part of managing these jobs includes configuring and maintaining the QMMU; Qache Virtualization Modules 707, 807, 907 where the QMMU maintains cache coherence between the local qache copy and the local qache copies of other hybrid processors on the system qache bus. As such the hybrid processor 708, 808, 908 is a collection of concurrent quantum and classical cores that can share memory and form a standalone-capable unit for hybrid quantum computation. Note that the QPU cores 701, 801 are a combination of a QUIL machine, microwave signal generation/reception hardware, qubits, etc. as described below with reference to FIG. 13.

The neighbor hybrid processor 809 is a second hybrid processor that sits on a cache coherent bus with another hybrid processor. Examples of arbitrary parceling 810 of hybrid resources, which are arbitrary subsets of the available quantum and classical cores from the hybrid multi-processor that form the work units for execution of customer hybrid computation, are indicated in FIG. 8 for customers 1, 2 and 3 as 811, 812 and 813. All arbitrary subsets maintain tight coupling through the shared memory interface (system Qache bus).

Figure 9:
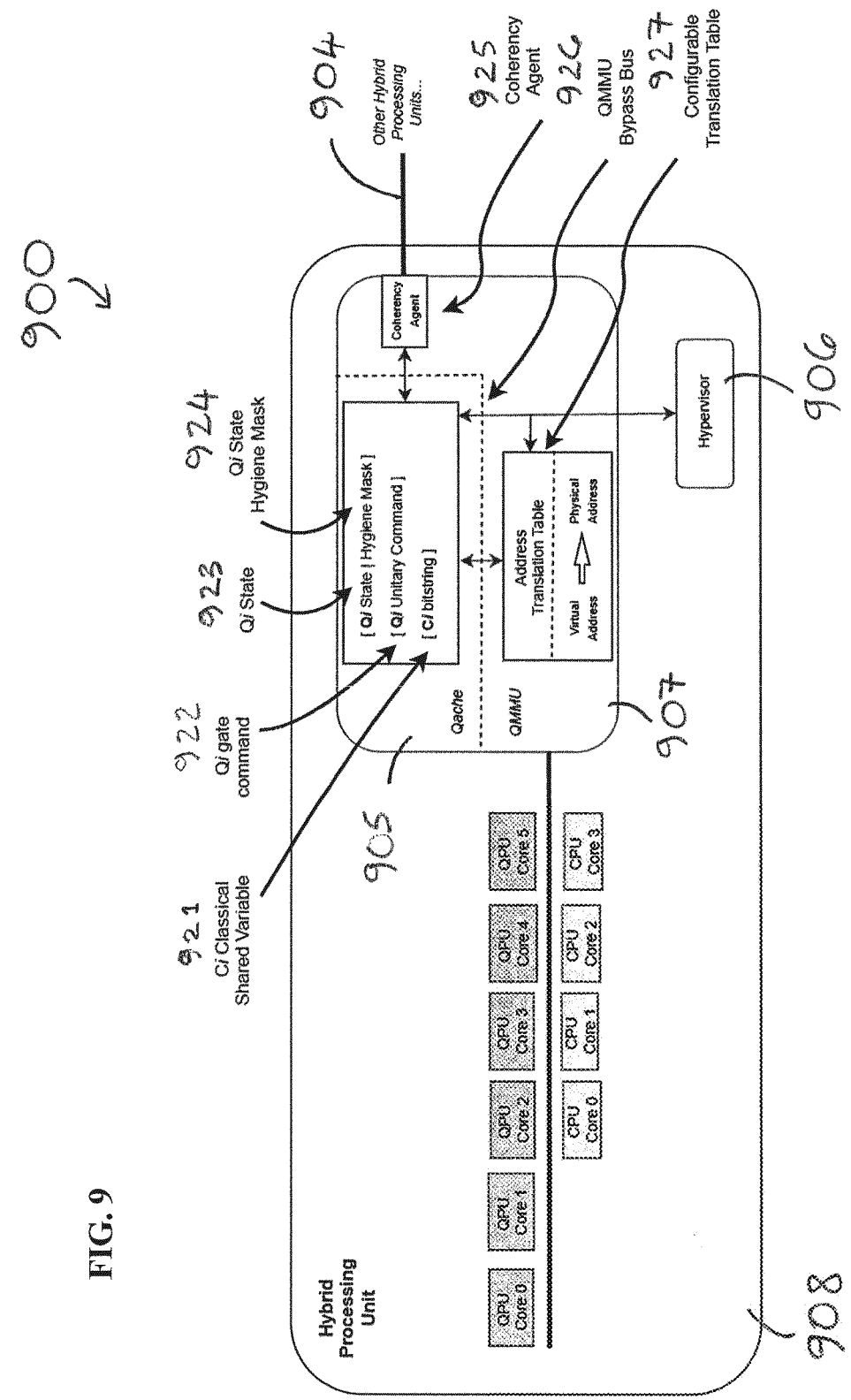
FIG. 9 is the hybrid quantum-classical processor unit of FIG. 6 showing the Quantum Memory Management Unit in more detail.

The QMMU and the Qache are shown in detail in FIG. 9. The QMMU and Qache operate with the following: Ci Classical Shared Variable 921, which is a classical bitstring for communicating state/sharing data between QPU and CPU cores; Qi Gate Command 922, which are gate commands for triggering specified state manipulation of qubits Qi from i=0to i=N, where N is the number of qubits allocated to that QPU core; Qi State 923, which is the last measured state of Qi (if gate has been applied, this Qache entry is marked dirty in the hygiene mask., if measured state is still valid, hygiene mask holds clean for this Qache entry); Qi State Hygiene Mask 924 indicates if quantum information exists in the system for Qi or if Qi contains a bit of classical information. A Coherency Agent 925 uses a cache coherence scheme (snooping, directory based, etc.) to maintain Qache coherency across the multiprocessor system.

A QMMU Bypass Bus 926 enables a calibration agent by providing direct access to underlying physical qubit resources, and also enables virtual migration within or between systems. The hypervisor 906 has knowledge of qubit topology to process quantum state swap (within the system) when the cache for a qubit state is dirty and re-parcelling is requested. If the qache for the qubit state is clean, the classical information itself can be shuffled (within or outside system) and the freed qubit re-initialized.

Configurable Translation Table 927 enables virtual "migration" within a system. Qubits can be retargeted system wide by code in situ using this table, alleviating the need to physically move the code around the system in order to reparcel.

At compile time, user code can be targeted to specific plaquettes, by querying the calibration database for the details of each gate for a corresponding qubit in the plaquette and then synthesizing binary programs consisting of schedules of primitives such as waveforms, delays, phase changes, as well as explicit waits for an operation to complete on another sequencer (communicated via the "spoolnet" described below). In this case, deterministic programs can be completely specified as a set of scheduled operations with known durations. Alternatively, the user code can be compiled to "relocatable" code that consists of gate operation templates on virtual qubit targets. When the program is scheduled to run on an allocated set of physical qubits, a lookup table is generated mapping the low-level operations that make up the gate operation template on virtual qubits to calibrated operations on the corresponding physical qubits. As an example, a CZ gate on virtual qubits 0 and 1 could result in the following gate operation templates.

For the Z (flux) control on qubit 0
1. WAIT for "done" message from any XY operations on qubit 0 and qubit 1 to complete. The origin and encoding of the "done" message to wait on is obtained from the lookup table populated by the hypervisor.

2. PLAY waveform at location 0. This location is reserved for the calibrated CZ waveform for this gate
3. SEND message "done" to all controls in this plaquette. The destination and encoding of this "done" message is obtained from the lookup table populated by the hypervisor.

For the XY (gate) control on qubit 0
1. WAIT for "done" message from Z controller
2. DELAY for calibrated time stored in spooler reserved memory location "A" to effect any RZ correction gate needed
3. Send "done" message to all controls in this plaquette. The destination and encoding of this "done" message is obtained from the lookup table populated by the hypervisor.

For the XY (gate) control on qubit 1
1. WAIT for "done" message from Z controller
2. DELAY for calibrated time stored in spooler reserved memory location "A" to effect any RZ correction gate needed
3. Send "done" message to all controls in this plaquette. The destination and encoding of this "done" message is obtained from the lookup table populated by the hypervisor.

At run time, the lookup tables would be initialized by the hypervisor with the specific details required to target the allocated physical qubits. These instructions then directly populate the scheduling queues of the spooler associated with each controller. See figure "details of a spooler." Each entry in the scheduling queue has a timestamp or condition indicating when the operation should be executed. The entries can include operations to control oscillators, which could be implemented as numerically controlled oscillators (NCOs) which track the frequency of the qubit operation (i.e. the frequency of the f01 transition or of the CZ02 flux pulse). The entries can also indicate which waveform envelope should be played, as well as which oscillator should be used to modulate the waveform to perform the desired gate operation. The lookup tables could also be implemented by dynamic signal routing between sequencers co-located on the same silicon chip, physical board, or potentially between boards. This would dramatically reduce the latency compared to sending messages over an encoded or multiplexed bus.

Lower level physical instructions can also be provided as part of the instruction set which bypass the QMMU lookup table functionality to allow direct physical access to the qubit control sequencers. This would provide a natural way to perform calibration operations and system diagnostics. These lower level instructions could be implemented by providing a single "mode" bit in the op-code to distinguish user-level virtual instructions requiring retargeting from lower level system instructions. These lower level system instructions could also be restricted so that only certain memory locations could execute them, as a means of improving system security.

Figure 10:
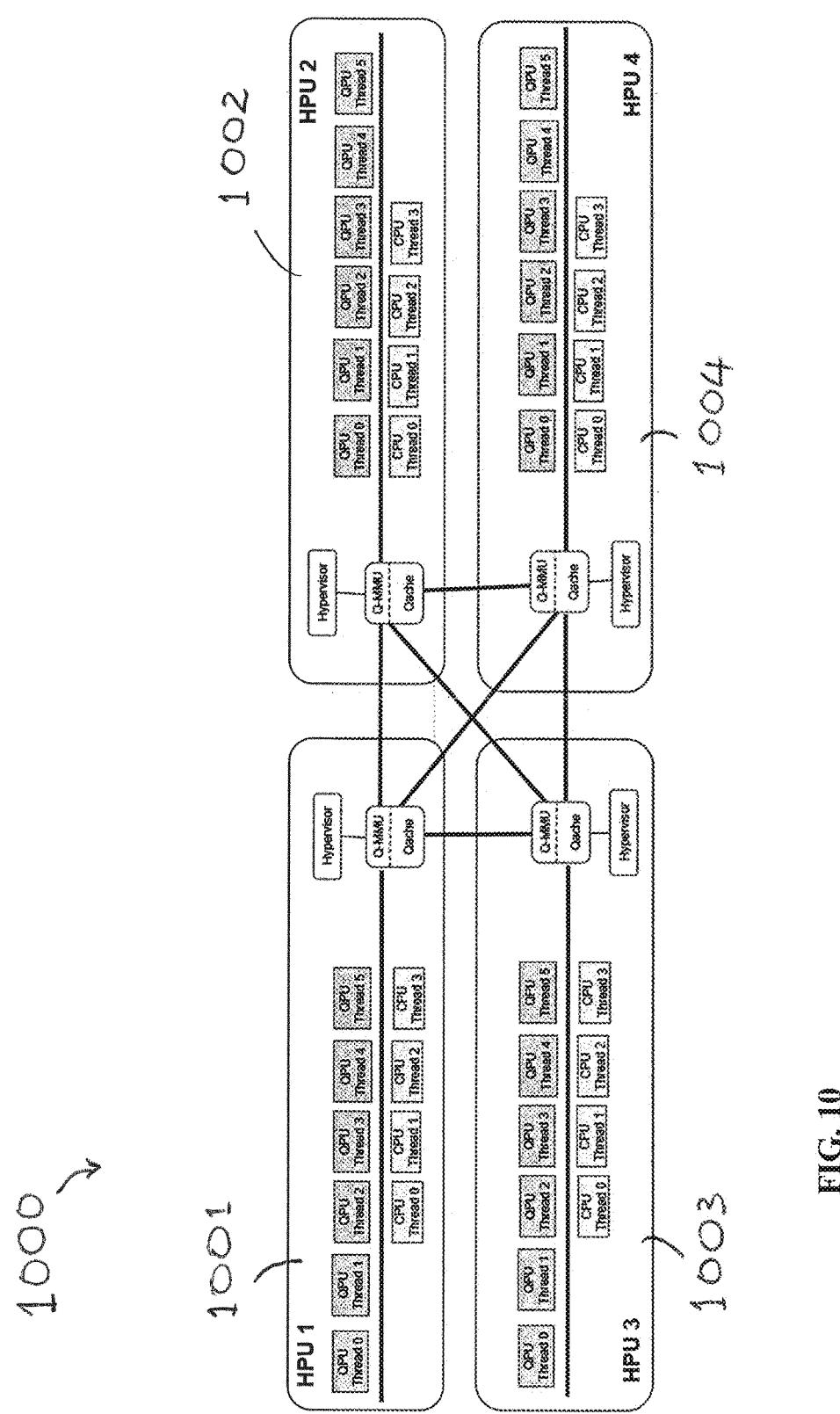
FIG. 10 is a representation of an example 4-processor coherent virtualizable hybrid quantum-classical processor system.
Figure 11:
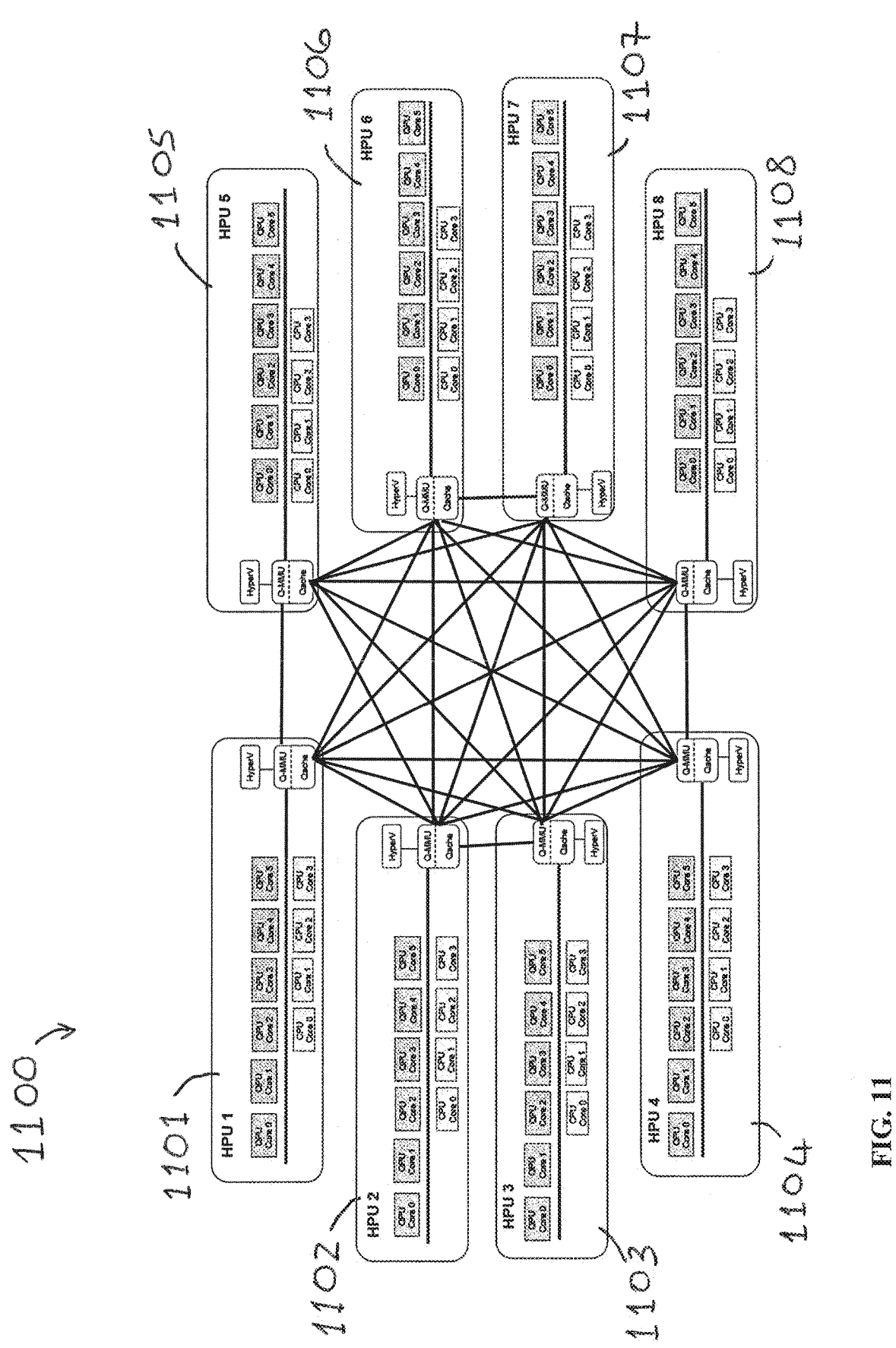
FIG. 11 is a representation of an example 8-processor coherent virtualizable hybrid quantum-classical processor system with a fully connected topology.
Figure 12:
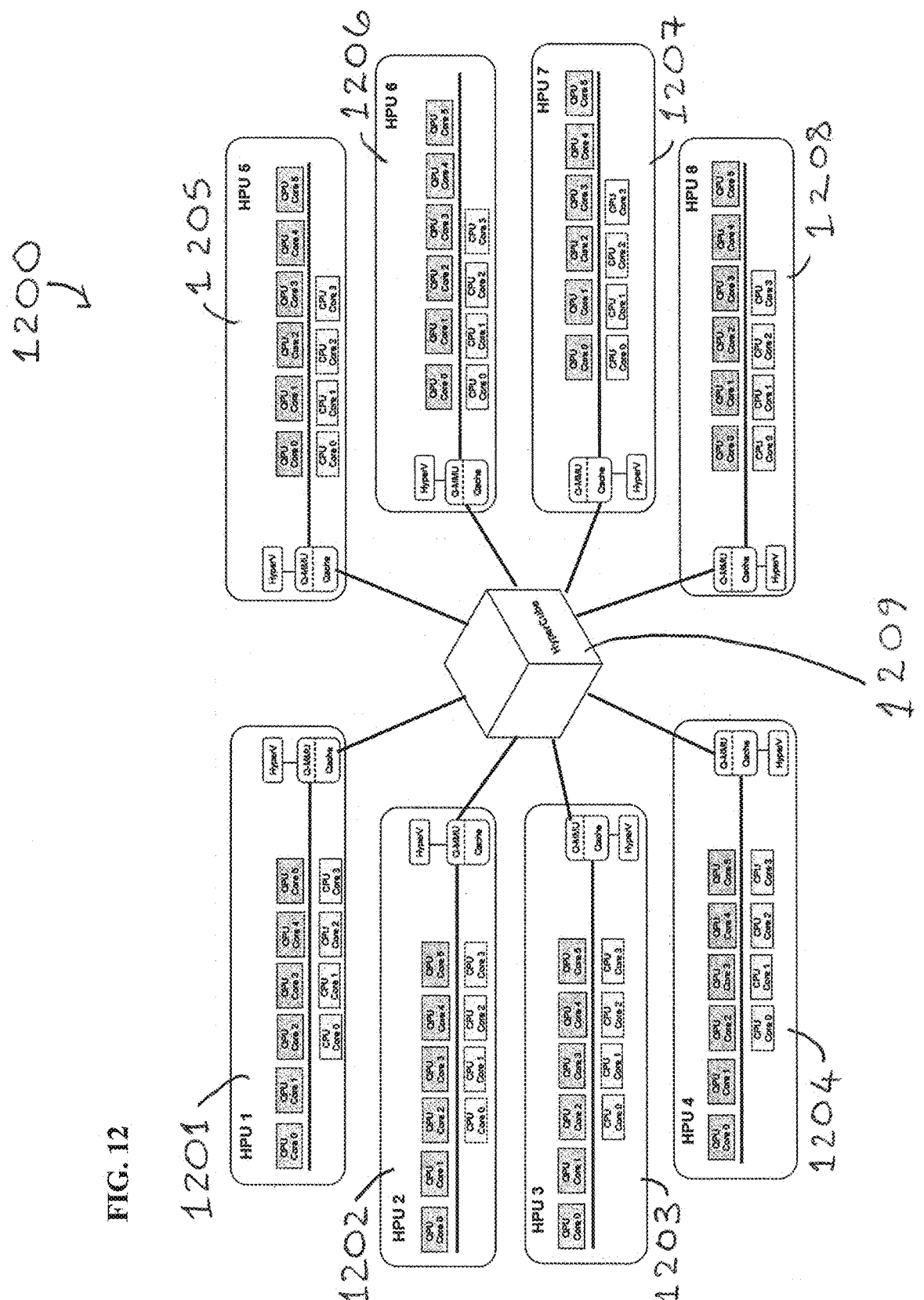
FIG. 12 is a representation of an example 8-processor coherent virtualizable hybrid quantum-classical processor system with a hypercube connected topology.

Arbitrary Qache bus topologies are supported and are limited only by balancing IO constraints with latency overhead considerations. Here follows a variety of possible Qache Bus topologies as the system scales to many hybrid processing units (arbitrary resource parcelling not shown). A 4-processor coherent system 1000 is shown in FIG. 10; the system comprises four HPUs 1001-1004. FIGS. 11 & 12 show an 8-processor system (HPUs 1101-1108, and HPUs 1201-1208, respectively) with two different coherency topologies—fully connected and hypercube (1209), respectively. The hypercube case could be generalized as connecting the HPU via a network switch which could implement a number of topologies internally—fully connected crossbar, hypercube, hypertorus, etc. As the system scales past a fully connected graph, the application model, IO constraints, latency overhead, and bandwidth limitations need to be traded off in the coherency mechanism and topology employed (e.g., the speed of snoop based protocols will be overcome by its bandwidth inefficiency, the IO scalability of the hypercube will win out over the speed of the fully connected graph, etc.).

A single user can be allocated resources across multiple HPU units, and the resources within each HPU can be allocated among many simultaneous user programs. At a finer level, multiple users can run on subsets of qubits within each QPU unit, and the classical portion of the program control can run on subsets of the CPU cores available in each HPU.

The QMMU can parcel up, virtualize, and pool quantum IC's (even across different fridges). This allows us to offer arbitrary plaquette bundling w/classical resources—cores can remote write qubits through the Qache bus at a small and bounded latency cost (one hop). This would allow any core to control not only any physical qubit anywhere on the Quantum IC but even physical qubits on remote IC's (provided the physical qubit has been mapped by the hypervisor to the program's virtual address space and the respective daughter cards are accessible over the same Qache Bus). Therefore there is the flexibility of putting a "foreign system" on the "ring" as in FIGS. 10-12 (where one of the HPUs may be the foreign system).

Customers may want a mix of dedicated but interconnected resources, as well as multi-tenant resources. For example, a customer may prefer dedicated access to a physical system for reasons including increased performance or more security. The customer can generate a deployment policy that governs how the user applications are deployed to the hardware. This deployment policy would imply requirements on the underlying hardware, and thus could be billed at different rates depending on the demand for the hardware resources. Using the HPU memory-coherency schemes (i.e. Qache) shown above, there are at least three inter-thread latency classes:

Level I: Local Qache latency (~10's ns)

Level II: System Qache Bus latency (~100's ns)

Level III: Networked latency (~<1 ms)

Intra-HPU thread latencies are always Level I by definition because they share a local Qache. HPU's on the same System Qache Bus are "Qache Connected" and have level II capable inter-thread latency relationships between them. A level III inter-thread relationship can be formed between any HPU's across the datacenter since it is built from a conventional network connection.

When deploying an application on the HPU based services, the following decisions need to be made, either automatically by the compiler or other application, or by the user explicitly. First, should the application be constrained to a dedicated set of resources (to the exclusion of other users or applications) or can it target virtualized hardware, and then be mapped to physical hardware dynamically by the hypervisor? Second, various metrics need to be specified: how many QPUs to use (perhaps to parallelize the algorithm); how many interconnected qubits are needed in the lattice for the algorithm to run on; and what classical compute resources are needed (CPU cores, GPU cores, memory space, etc).

Second, given the results of the above decisions, what latency class (described above) is needed? For programs that use little to no control flow during the coherence time of the qubits, the latency between qubit controls (spoolers) is of little concern, whereas programs that rely on performing gates conditionally based on the measurements of other qubits will have stringent latency requirements. This will constrain the hypervisor when it allocates the physical resources to run the program.

Third, the qubit lattices need to be decided. This includes both the topology needed (what degree of interconnection is available and what is most efficient for the algorithm), as well as the qubit technology itself. The HPUs could support QPUs based on a number of qubit technologies (i.e. superconducting qubits, spin qubits, ion traps, etc), some of which may be more suited to a particular algorithm than others.

Finally, the user can then run their application on a quantum virtual machine, quantum simulator, (using classical compute resources in the HPUs or in dedicated classical compute hardware), and when desired, seamlessly migrate the application to real qubits.

Figure 13:
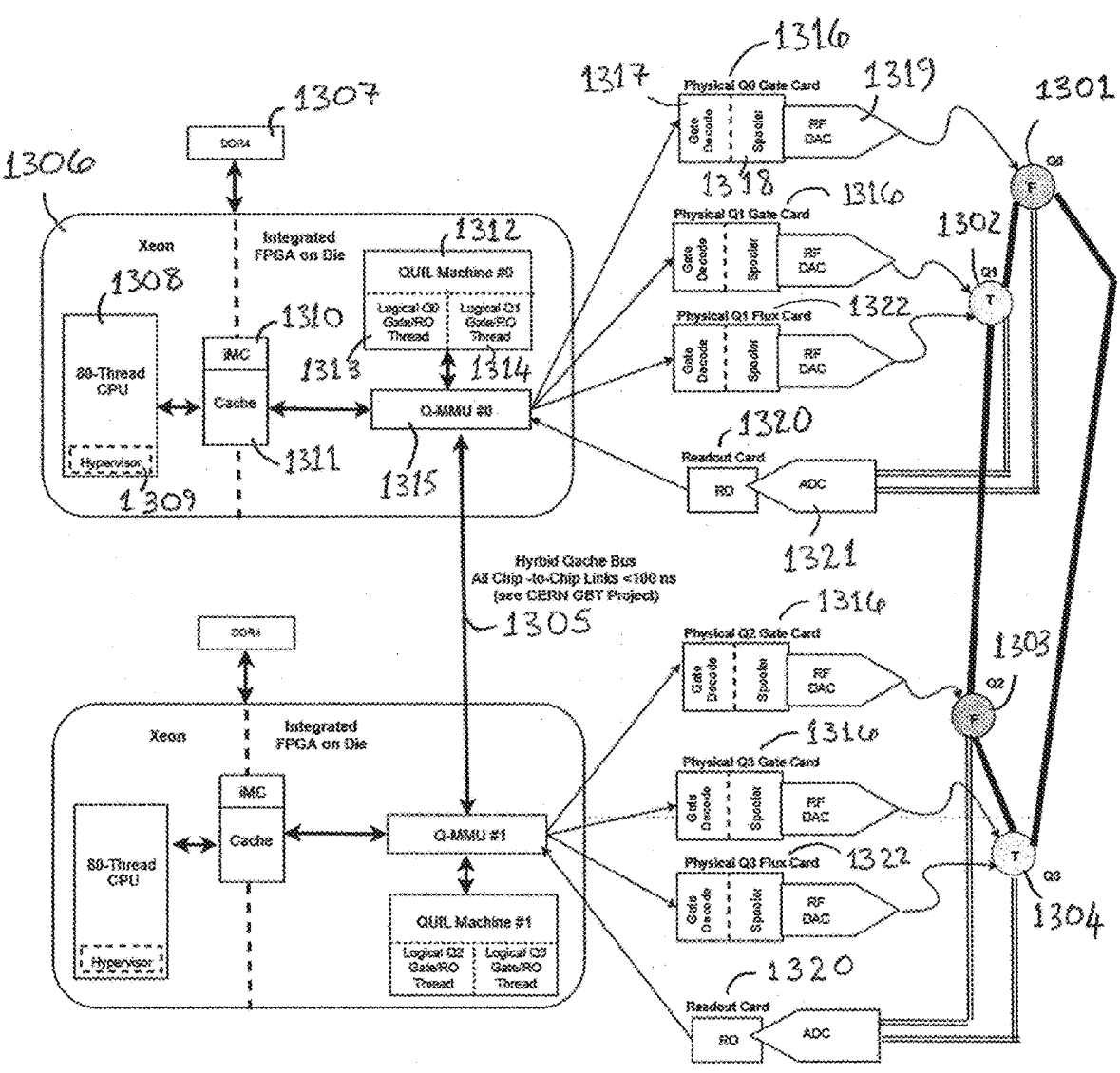
FIG. 13 is an illustration of an example of a multi-tenancy enabled 4 qubit processor.

FIG. 13 shows an example system 1300 which comprises a hybrid classical computer-quantum control system connected to a four-qubit quantum IC. In this example two of the qubits, Q0 1301 and Q2 1303 have a fixed frequency, while Q1 1302 and Q3 1304 are tunable via a magnetic flux provided by an additional digital to analog converter channel (see channel with physical flux card 1322, for example). The system is scalable to a much larger number of qubits and with many more qubits controlled per control node. All of the soft digital links shown in FIG. 13 belong to one bus (the system Qache Bus). The Qache bus could be implemented between chips—see hybrid Qache bus 1305, for example—with deterministic low latency using communication protocols such as the GBT/Versatile Link developed at CERN. (See https://wiki.to.infn.it/lib/exe/fetch.php?media=elettronica:projects:cms_dt:gbtsystem:baron-gbtfpgaug.pdf) There is a sideband bus that is not shown here for the sake of simplicity (spoolnet), that is used for timing synchronization and concurrency control.

In FIG. 13, the classical CPUs 1308 can have the same industry-standard architecture as is used in general purpose data centers. This would allow a user's program to run against a quantum virtual machine (QVM) and then immediately target the real QPU, without needing to recompile the software. This could happen after a user is done prototyping hybrid algorithms on a QVM in the traditional cloud infrastructure and then wants to run code on a real Quantum IC.

In FIG. 13, the logic 1306 can be implemented as a standard processor chip connected to a custom logic chip, which in turn could be implemented as an FPGA or an ASIC. This connection could be done inside a standard BGA package, or could be implemented as a stacked multi-chip module. Alternatively, a single custom logic chip could be used, either an FPGA with integrated hard-IP CPUs (e.g. Intel Stratix with ARM CPUs) or as an FPGA with soft-IP CPUs. The custom logic chip could also be an ASIC, with or without a portion of reconfigurable logic for efficient implementation of dynamic re-routing of the internal, on-chip communication busses (Qache and spoolnet) described above. As an example, Intel produces FPGAs with integrated cache coherent high bandwidth interconnects (QPI and UPI) designed to interface with high performance Xeon CPUs.

In the specific example shown in FIG. 13, the logic 1306 is connected to DDR4 Random Access Memory (RAM) 1307, hybrid Qache bus 1305 for communication between chips, gate cards 1316 and readout cards 1320. The logic 1306 comprises: an 80-thread CPU 1308 including hypervisor 1309; an Integrated Memory Controller (IMC) 1310 and cache 1311, a QMMU 1315 and a QUIL machine 1312 with modules 1313, 1314 for handling logical gate/readout threads. The IMC is the control logic needed to interface to DDR SDRAM memory—the IMC 1310 would load data from DDR4 1307 into the cache 1311 to be used by the rest of the system. The QUIL machine represents any processor or logic that is responsible for reading machine instructions from memory and executing them against qubits, for example the QUIL code gets compiled to binary machine instructions which the QUIL machine reads from memory and executes, thereby generating gates and readout instructions, and returning results to memory to be used by other QUIL machines or the classical CPU code. Physical gate cards 1316 are provided for each qubit, where each gate card comprises a gate decoder 1317, a spooler 1318 and an RF DAC 1319. Furthermore, physical flux cards 1322 are provided for each of the tunable qubits (Q1 & Q3), where each gate card comprises a gate decoder, a spooler and an RF DAC. Readout cards 1320 with ADCs 1321 are provided for pairs of tunable and fixed qubits, for example Q0 & Q1 and Q2 & Q3.

Each of the physical controls for the qubits can be implemented as a "spooler" 1318 which is responsible for tracking the phase of the associated control signals (using. for example, a numerically controlled oscillator), and which produces modulated waveform data for the digital to analog converters (DACs) 1319 which produce the analog signals to control the qubit. The spooler may have a pre-loaded waveform library such that specific gate signals can be generated by requesting a given waveform modulated by a specified oscillator frequency and phase. All of these events can be scheduled to occur at a specific time, or on reception of a signal from another spooler or other part of the system. For qubit state readout, the spooler works similarly, but performs a matched filtering operation to determine the qubit state, instead of modulating a gate control waveform.

During the migration, the hypervisor 1309 must configure the QMMU 1315 to map the virtual resources specified in the program to physical qubit resources. The Quantum Memory Management Unit (QMMU) is a hardware accelerated virtualization module in the fabric of the on-die integrated FPGA that is cache coherent with the many hybrid programs running on that chip. The QMMU holds a global view of the Physical Memory of the full hybrid system. It is able to achieve this using an architecture similar to what can be found in cache systems with many cores. Every QMMU in the hybrid system sits on a very low and bounded latency ring (the System Qache Bus) and broadcasts (i.e., for Qache Bus snooping) the following: bitstrings of states resulting from measurement, dirty cache notifications when the host box commands a quantum gate, and updates to shared classical variables. A completely clean quantum state cache implies all qubit states are known and no quantum information exists on the system. At this time, the program state could be frozen and safely swapped around the system. However, because the QMMU 1315 can be dynamically reconfigured by the hypervisor 1309, the virtual to physical mappings of the qubit resources can be modified in situ, and the user's virtual resource allocation instance only need be frozen and swapped if it is being completely removed from the system.

Benefits of this architecture include: transparent user virtual resource migration from QVM-capable to QPU-capable; leverage state of the art compute tools by using industry-standard CPU architectures (e.g. x86_64 or ARM); memory used by the quantum program (e.g. a program written in QUIL) is natively available to the CPUs on the system; QMMU virtualization supports arbitrary plaquette bundling with classical resources; hypervisor and QMMU enables a mixed-tenant model with rapid reallocation of resources; architecture scales to many qubit control cards per chassis, and many chassis per coherent system; latency of a single link is almost same order of magnitude as signal propagation delay, (of order 10's of nanoseconds); there is hardware support for multi-threaded quantum programs; and Global Hybrid Memory aggregated (broadcasts on Qache Bus are bus snooped) and virtualized by the QMMU.

Figure 14:
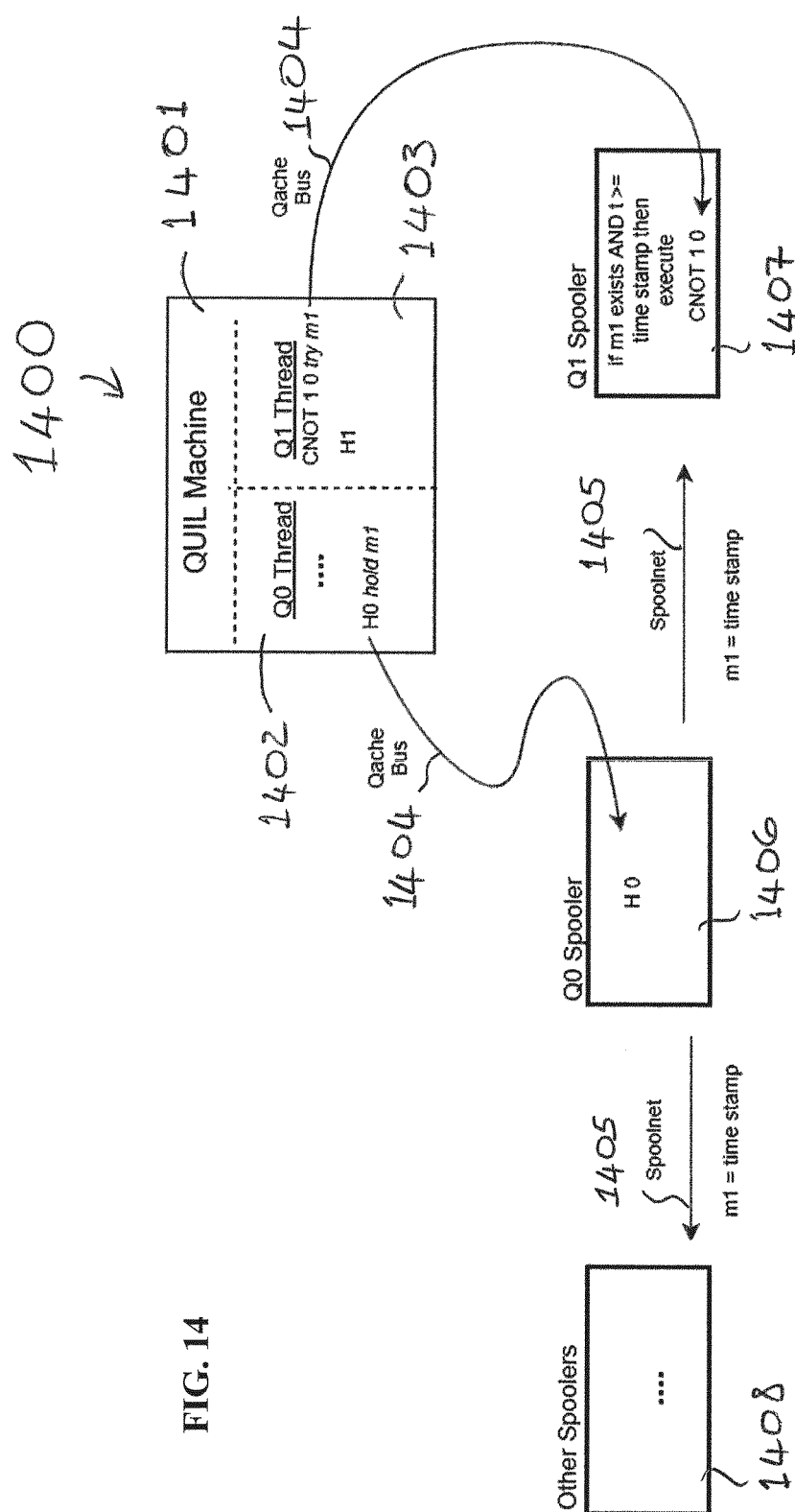
FIG. 14 is a representation of a method for enforcing execution ordering between sequencers controlling different qubits.

A method 1400 for QUIL Concurrency Control is described with reference to FIG. 14 for enforcing execution ordering between the sequencers controlling different qubits. QUIL machine 1401 comprises thread generation modules 1402 and 1403 for qubit 0 and qubit 1, respectively. Instructions for the generation of an H gate and the sending of a timestamp m1 are generated by module 1402 for application to qubit 0. The instructions are sent over the Qache Bus 1404 to the spooler 1406 for qubit 0. Instructions for the generation of a CNOT gate with qubits 0 and 1, after receipt of timestamp m1 are generated by module 1403 for application to qubit 1. The instructions are sent over the Qache Bus 1404 to the spooler 1407 for qubit 1. Execution of the instructions at spooler 1406 results in the formation of an H gate on qubit 0 and the "m1" timestamp being broadcast over the spoolnet 1405 from the spooler 1406 for qubit 0 to the spooler 1407 for qubit 1 and other spoolers 1408 for other qubits. Receipt of the m1 message at spooler 1407 for qubit 1 results in the formation of the CNOT gate with qubits 0 and 1. By sending these messages on different ("out of band") connections 1405 (referred to here as Spoolnet) than the Qache bus 1404, the latency of these concurrency messages can be guaranteed without impacting the performance of the Qache bus.

Spoolnet 1405 distributes sub-nanosecond resolution timing and allows QUIL thread synchronization to be implemented downstream from the QUIL machine 1401, thereby allowing higher level synchronization objects (i.e., no explicit notion of time, only synchronization primitives) to be used at the QUIL Machine level. These primitives are embedded in the QUIL instructions as a tag and require no QUIL Machine clock cycle overhead, yet provide maximum latency performance in enforcing inter-qubit gate dependencies between threads.

This scheme for concurrency control has many benefits including: guarantees satisfaction of gate dependencies; no need for dedicated clock trees; abstracts timing from QUIL machine by implementing QUIL synchronization primitives; deterministic, sub-nanosecond timing can be accomplished over standard computer data connections like Ethernet by using techniques similar to those developed as part of the White Rabbit protocol (see https://white-rabbit-.web.cern.ch/); Out of Band traffic preserves tight/predictable latencies on Qache Bus 1404 and Spoolnet 1405.

In summary, for some embodiments of the coherent virtualizable hybrid quantum-classical processor system described above with reference to FIGS. 7-14 one or more of the following advantages can be achieved. First, each qubit control signal is independently controlled by a thread of computation (implemented by a CPU scheduling operations on the spooler). These threads are synchronized, either with explicit signals, or through deterministic timing. This makes it very natural to allocate a collection of control threads (i.e. those associated with a specific subset of qubits) to each user to natively support multi-tenancy. Second, by implementing these independent control threads with an industry standard CPU architecture, the same computer hardware is used for both the classical computations of the hybrid program, as well as for executing the quantum gates. Thus, there is less of a boundary between the classical part of the program and the quantum part. As an example, instead of having a QUIL program running on specialized arbitrary waveform generator hardware, waiting for gate parameters from a standard computer which is running a classical optimizer, we have the optimizer running on a CPU and when a quantum result is needed, the same code on the same CPU executes the necessary quantum instructions, and the qubit results appear directly in the memory space of the same CPU so that the optimizer can continue operation immediately.

Systems and methods for matching orders within a demand queue to a set of dynamically provisioned quantum-classical instances, and allocating such instances to particular jobs/users are described as follows. A system is described that, each epoch, takes as input both the order book (demand queue) and the physical system capabilities (the available quantum-classical instances/plaquettes) and provides a partitioned and provisioned system for the duration of that epoch. This system may also receive as input the performance and quality metrics of the qubits and other system characteristics. A connected set of qubits on a quantum IC is referred to herein as a "plaquette", which may also be described as a configuration of qubits and qubit-qubit links on one or more quantum computation devices. An "epoch" is defined herein as the period of time during which a physical quantum-classical hybrid computing system is provisioned in a particular fixed configuration; the epoch time may be on the order of hours, or minutes, or in embodiments seconds or fractions of a second.

Methods of determining the price of plaquettes sold on a hybrid quantum-classical computer system are varied and different approaches may be suitable for different circumstances. The minimum unit of time for utilizing a plaquette on a QPU that may be purchased is most conveniently a single epoch, or in some embodiments, multiple epochs. Furthermore, a user will often want to start use at a specified time or at least within a specified time window. Prices for specific qubits or groups of qubits from amongst a QPU chip full of qubits may be varied depending on factors such as fidelity of qubits and groups of qubits. In some embodiments a hybrid quantum-classical computer system may autonomously sample and measure its own fidelity and use those fidelities as an input to one or more of: a) order matching; b) plaquette decomposition of the full chip; c) pricing of plaquettes. Furthermore, plaquettes that remove the possibility for large adjacent plaquettes on a chip may be priced at a premium.

When one doesn't know a priori what QPU time is worth, a customer's application/request is going to inform this, and auction types of pricing models may be effective. For example, a second price auction may be used where the winner of the auction is the second highest price offered. An auction system can comprise multiple rounds of bidding, although multiple bidding rounds might not always be directly compatible with a real-time bidding/scheduling process. The auction process can sell specific future epochs on the qubits of a QPU. One round of the concrete auction system could look as follows: users submit collection of bids for epochs on plaquettes; auction backend greedily produces several alternative plaquette schedules potentially combining several bids that can run concurrently to maximize the revenue of such a bid combination and usage of the QPU; and the second most valuable bid combination wins the round. In addition to selling fixed future scheduled qubits in some embodiments one can also always keep part of the QPU free to accept high priority jobs in real time based on a single round bidding process.

An example computing system that assigns prices to different qubit regions on a quantum processor may take input from one or more of the following sources: a long-term database of design characteristics of the device (e.g., qubit count, qubit connectivity); a short-term database of measurements pertaining to the physical characteristics of the device (e.g., one-qubit, qubit-qubit interaction, readout fidelities, gate fidelity, native gate availability, qubit count, link count, link topology, coherence time, relaxation time, etc.); inferred characteristics pertaining to the expressiveness of the device (e.g., instruction availability); a database of user requests (e.g., system-wide strain, historical usage patterns); and the particular characteristics of a given user's request (e.g., urgency or expected duration). This information can be retrieved from remote stores via network communication, from remote agents via network communication, from local caches. The system may be configured to assign prices to plaquettes based on one or more of: their physical characteristics; response to user demand; historical popularity; and immediacy.

The system may be configured to automatically assess the physical characteristics of a quantum device for input to a pricing model. The system may assign prices to plaquettes through a (multiple-round) pricing auction. Furthermore, a process may be implemented that validates plaquette fidelity immediately before user residence begins.

In some instances, a method for calculating a price for use of a configuration of qubits and qubit-qubit links on one or more quantum processor units by a user for running a computer program, may comprise: accessing a first database by a computer processor unit to collect design characteristics of the one or more quantum processor units, including inferred characteristics pertaining to the expressiveness of the one or more quantum processor units, wherein the inferred characteristics include instruction availability; accessing a second database by the computer processor unit to collect measurements of physical characteristics of the one or more quantum processor units; accessing a third database by the computer processor unit to collect characteristics of a specific user's request; and determining the price using data collected from the first, second and third databases.

In some instances, a computer system for calculating a price for use of a configuration of qubits and qubit-qubit links on one or more quantum processor units by a user for running a program, may comprise: a first database for storing design characteristics of the one or more quantum processor units, including inferred characteristics pertaining to the expressiveness of the device, wherein the inferred characteristics include instruction availability; a second database for storing measurements of physical characteristics of the one or more quantum processor units; a third database for storing characteristics of a specific user's request; and a computer processor unit for determining the price, wherein the computer processor unit is linked to the first, second and third databases for accessing input data for the determining.

Figure 15:
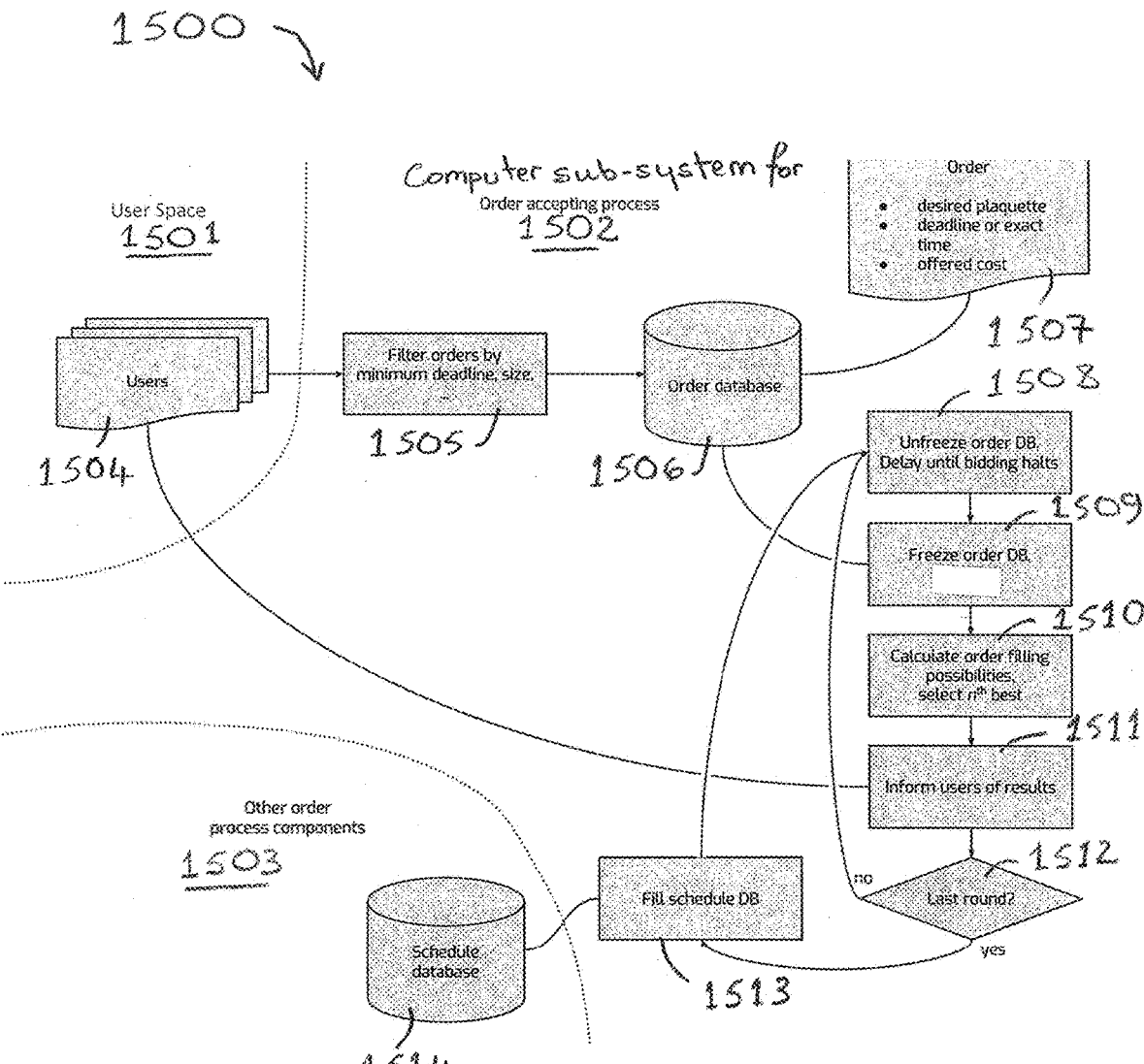
FIG. 15 is a flow chart showing an example quantum resource order matching and filling process.

An embodiment of a long-term ordering matching system 1500 is shown in FIG. 15. The system comprises a user space 1501, a computer sub-system 1502 for running an order accepting process, and other order process components 1503. Users 1501 submit bids (via a web interface, via a web API, etc.) on desired order configurations, which may include: a particular segment of time (e.g., 9 am-5 pm on Jul.

2, 2018), a particular duration (e.g., one hour), and/or a minimum duration (e.g., at least one hour); a particular subset of qubits (e.g., qubits 0-5), a particular configuration of qubit connectivities (e.g., a T-shaped configuration of four qubits), or a particular quantity of qubits (e.g., any four qubits); a lower bound on qubit quality (e.g., minimum readout fidelity of at least 95%); as well as other qualities.

The orders are processed by a filter 1505 which may be configured to reject orders unless they satisfy certain criteria, so as to constrain the auction. Such criteria may include: a minimum plaquette size (e.g., at least 8 qubits requested), sufficiently distant start time (e.g., no sooner than three days after the end of the auction), a maximum duration (e.g., no longer than one day), as well as other qualities. One or more of these criteria may be chosen to simplify the packing process (e.g. partitioning of the QPU chip into plaquettes) as follows: larger orders admit fewer possible configurations; separating the start times for the orders of large and small qubit counts ensure that only large qubit count orders initially need to be packed; a limited duration makes resource exclusion less likely; and so on. Different order filling processes may generate different constraint sets.

Bids (both the offered value and the configuration data as specified above, as shown in the example order configuration 1507) are captured in an order database 1506, where they collect. After some interval of time passes (e.g., the duration of time available to bidders in the auction divided by the number of rounds in the auction, so as not to keep the auction horizon a fixed distance away), a background process running on module 1509 locks the order database, disallowing any more orders to be placed.

An order filling process then activates, calculating several possible ways that non-conflicting orders could be filled. One such filling is then selected according to some metric (e.g., the nth most revenue-maximizing possibility) by module 1510. A bidding round counter 1512 is decremented and the bidding process is repeated if the round counter is not at zero. If the counter is zero, the order filling selection from the previous step is sent by module 1513 to the scheduler database 1514 as the plan of record, and the counter 1512 is reset to the number of rounds in the next auction. In both cases, the users participating in the bidding process are informed of the results by module 1511. The order database 1506 is cleared and unlocked and is kept unlocked by module 1508 until the bidding is halted.

In some instances, a method of auctioning quantum computing resources, may comprise: opening an auction and receiving price bids electronically submitted by users, each price bid having an order with a user desired qubit configuration, each order including a number of qubits, a configuration of qubit connectivities, a lower bound on qubit quality and one or more of a duration, a particular segment of time and a minimum duration; rejecting a specific price bid of the price bids unless the specific price bid satisfies a criteria, the criteria including one or more of: a minimum number of qubits and qubit-qubit links on one or more quantum processor units, a start time of at least a fixed time in the future, and a maximum duration; on satisfaction of one or more specific criteria, closing the auction to any new price bids; activating an order filling process, the order filling process including calculating a plurality of solutions for filling non-conflicting orders, and selecting one of the plurality of solutions according to a metric; and informing users of a status of their price bids. Furthermore, computer systems may be configured to auction quantum computing resources as described above.

Determining plaquette resources needed for a program, with a quality estimate of the resources, can be done while preserving customer security and an agreement that the service provider won't inspect the semantics of their programs or how they're using their data—this can be achieved by anonymizing a program. For example, stripping the gate descriptions, except for some basic properties, in some embodiments including one or more of: what resources an instruction acts on; whether an instruction performs a measurement; an estimate of the number of times a given instruction might be executed; and a desired list of native instructions.

Comparing a program against a list of available plaquettes to find a good match may include, in some embodiments, one or more of: matching high-activity program links with high-fidelity QPU links; matching program topology (after restricting to high-activity links, for cases where the problem is made easier) with native QPU topology; and matching program qubit count with QPU qubit count.

Figure 16:
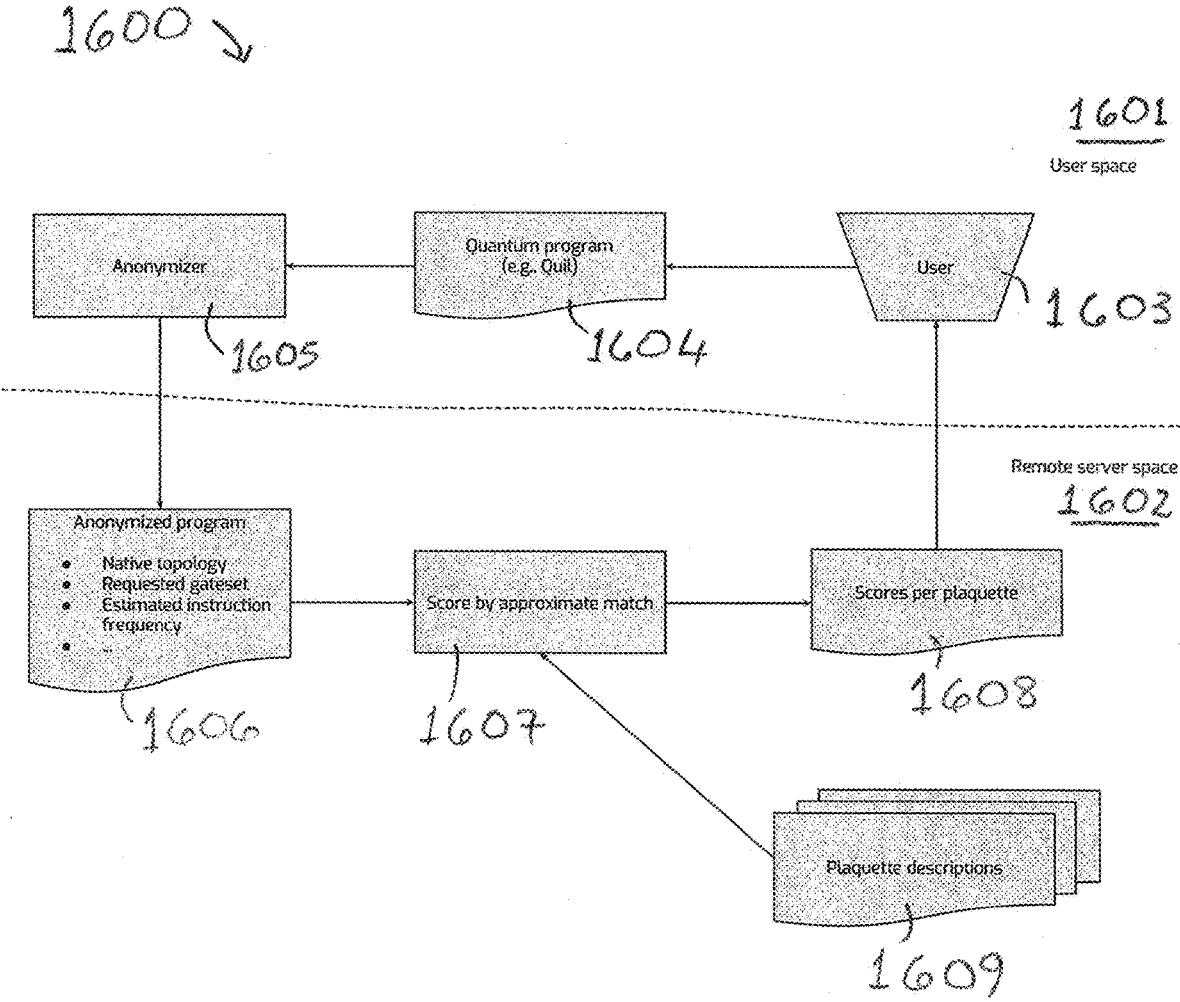
FIG. 16 is a flow chart showing an example process for matching of quantum computing programs to particular subsets of qubits on one or more quantum computation devices.

See the flow chart in FIG. 16 for an example of some embodiments. A user 1603 sends one or more quantum programs 1604 to a locally (in a user computer space 1601) running anonymizer 1605. The anonymizer removes distinguishing characteristics of the quantum program, then returns the anonymized quantum program(s) to the user. Examples of anonymization techniques include: removing gate parameters, removing gate names, permuting gates, removing control structures (perhaps retaining expected execution count for each instruction), removing all instructions and retaining only the expected gate set, as well as others. The user then submits the anonymized program(s) 1606 to an adviser 1607, which may reside on a remote server 1602 (e.g., one owned and operated by the service provider) or which may also reside on the user's machine. The adviser retrieves a list of available plaquettes, together with their operating characteristics from database 1609. (The precise transmission mechanism here depends on the residence of the adviser.) Operating characteristics may include one or more of: qubit counts, qubit connectivities, native gate sets, fidelity-type measurements of native gates, readout fidelity, relaxation or coherence time (T1 or T2) measurements, randomized benchmarking results, run quality of certain standard programs, historical drifts, coherent and incoherent noise channel measurements, as well as others. This retrieved data may contain information about all quantum devices or about just some; and it may contain information about all sub-plaquettes that could be leased on this device or about just those plaquettes which are available to be leased within some time window. The adviser 1607 then applies a combination of heuristics to judge the appropriateness of each plaquette for program execution, and provides scores for each plaquette. The set of heuristics might include matching native gate sets, matching plaquette and desired topologies, meeting fidelity requirements, meeting coherence time or relaxation time requirements, as well as others. Finally, the adviser returns these scores per plaquette 1608 to the user 1603.

In some embodiments, the adviser, which may be a computationally expensive service, can run on a remote server or on the user's local machine. If the adviser service runs on a remote machine, the user might first anonymize their program contents while preserving the salient operating characteristics. In both cases, the adviser service retrieves a list of available plaquettes and their operating characteristics from the service providers data servers. This data may contain information about all of the service provider's quantum devices or about just some; and it may contain information about all sub-plaquettes that could be leased on this device or about just those plaquettes which are available to be leased within some time window.

An example system according to some embodiments may be a system that marries quantum programs to potential plaquette venues.

An example process according to some embodiments may be a process that comprises one or more of the following: anonymizes quantum programs by erasing identifying characteristics; anonymizes quantum programs for structural analysis by third parties; combines the structural analyses of several quantum programs into a single collection of desiderata; compares the structure of one or more quantum programs with the structure of a quantum execution target and execution fidelity; compares the structure of a quantum program with the structure of a quantum execution target and estimates transfer faithfulness; compares the structure of a quantum program with the fidelity properties of a quantum execution target and estimates overall decrease in quality. Herein an identifying characteristic of a quantum program may include the names of gates, the parameters of gates, the ordering of gates, etc.

In some instances, a method of matching quantum computing programs to particular subsets of qubits on one or more quantum processor units, may comprise: receiving a quantum computing program by an anonymizer unit, the anonymizer unit processing the quantum computing program to remove distinguishing characteristics to provide an anonymized quantum computing program; extracting by an adviser unit of a basic structure of the anonymized quantum computing program, the basic structure including qubit count, qubit connectivity and minimum relaxation or coherence times for qubits; comparing by the adviser unit the basic structure of the anonymized quantum computing program with structures of a plurality of quantum execution targets on the one or more quantum processor units, wherein the plurality of quantum execution targets are subsets of qubits and qubit-qubit links on one or more quantum processor units, and determining appropriate quantum execution targets using a heuristic, the heuristic including one or more of: matching native gate sets, matching plaquette and desired topologies, meeting gate activation fidelity requirements, meeting read-out fidelity requirements, and meeting coherence time or relaxation time requirements; and generating by the adviser unit of output identifying recommended quantum execution targets for the quantum computing program.

In some instances, a computer system for matching quantum computing programs to particular subsets of qubits on one or more quantum processor units, may comprise: (1) an anonymizer unit for: receiving a quantum computing program by the anonymizer unit, the anonymizer unit processing the quantum computing program to remove distinguishing characteristics of a quantum computing program for anonymizing the quantum computing program; and (2) an adviser for: extracting a basic structure of the anonymized quantum computing program, the basic structure including one or more of qubit count, qubit connectivity, native gate sets, fidelity-type measurements of native gates, readout fidelity, execution fidelity, relaxation or coherence time measurements, randomized benchmarking results, run quality of certain standard programs, historical quantum processor unit performance drifts, and coherent and incoherent noise channel measurements; comparing the basic structure of the anonymized quantum computing program with structures of a plurality of quantum execution targets, wherein the quantum execution targets are subsets of qubits and qubit-qubit links on one or more quantum computational devices, and determining appropriate quantum execution targets using a heuristic, the heuristic including one or more of: matching native gate sets, matching plaquette and desired topologies, meeting fidelity requirements, and meeting coherence time or relaxation time requirements; and generating output identifying recommended quantum execution targets for the quantum computing program.

In some embodiments there is some kind of matching between an order book (whose rows consist of a user, a program, a qubit configuration—which consists of both a topology and fidelity requirements—and in some embodiments a time limit) and the available sub-plaquettes of a partially-utilized QPU. Furthermore, in some embodiments users pay more and get priority in the matching process; and in other embodiments the process is optimized for revenue, and accordingly schedules more resource-intensive jobs (which can be priced more highly) more aggressively. In some embodiments, particular plaquette configurations (which can be based on previous experience that a particular configuration is useful) can be preserved rather than allowing them to be split up into less useful configurations.

Figure 17:
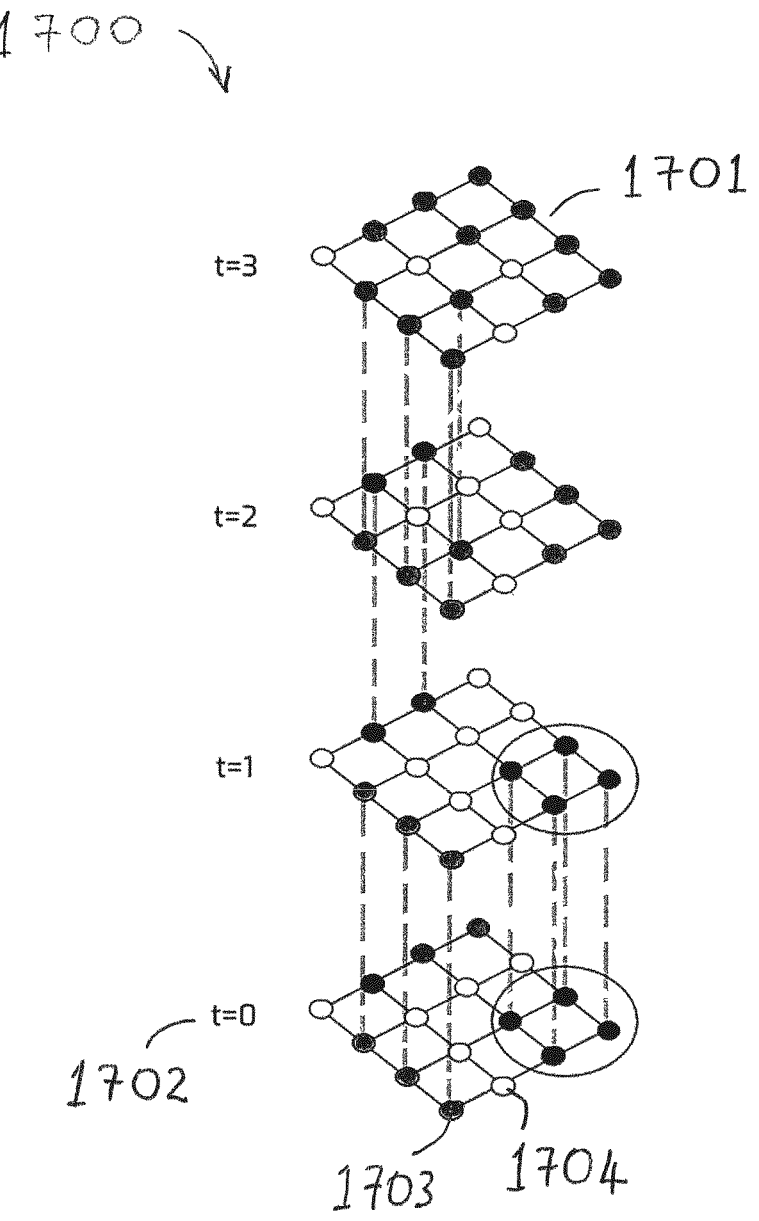
FIG. 17 is a ball and stick representation of an example partitioned quantum processor unit.

FIG. 17 shows a representation 1700 of a 16 qubit QPU 1701 with changing plaquette configurations over 4 subsequent epochs 1702 (t=0, 1, 2, 3) where individual qubits are grouped into a plaquette for each epoch (filled circles 1703). Plaquettes can generally persist for several epochs (vertical dashed lines) and may be separated by unused and inactive qubits (open circles 1704) to prevent or reduce cross talk or entanglement between plaquettes.

Figure 18:
FIG. 18 is a ball and stick illustration of a hierarchical plaquette fusion heuristic.
Figure 18:
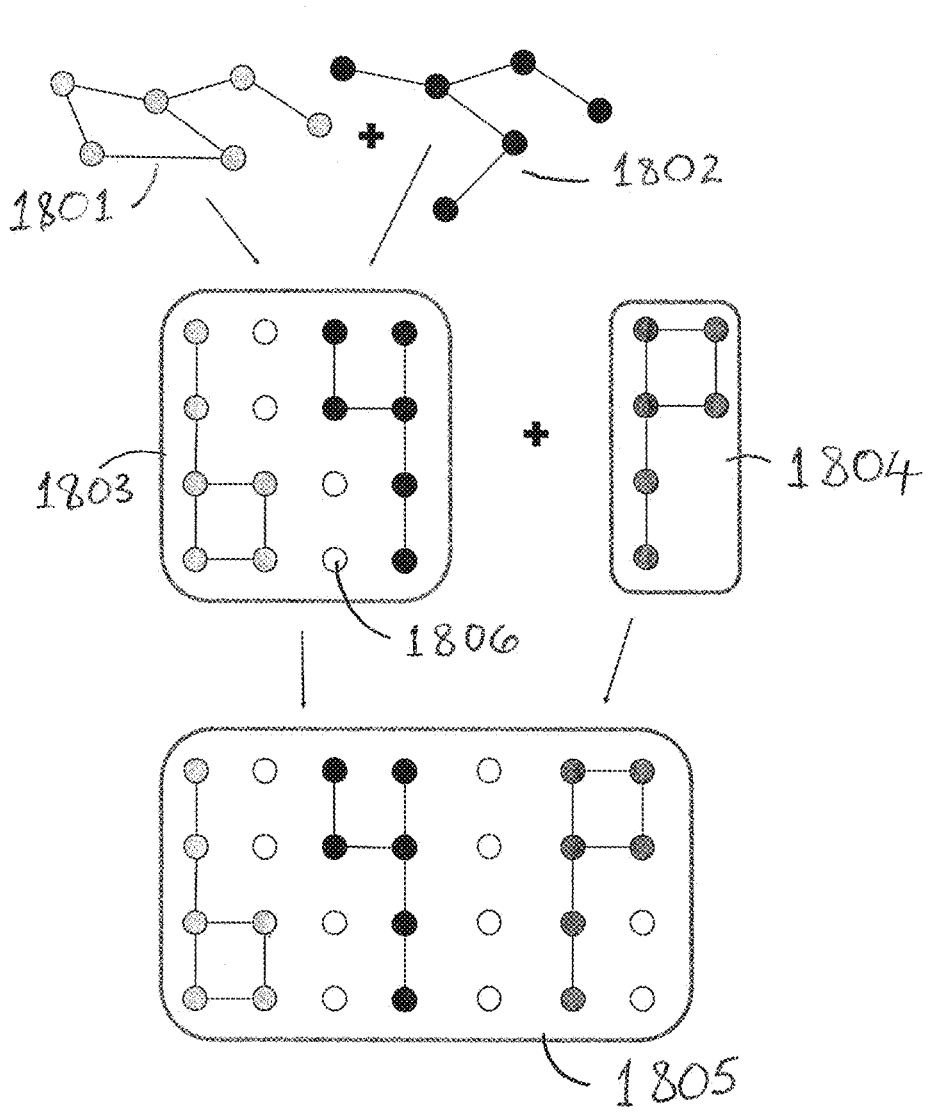

Process 1800 for combining plaquettes on an array of plaquettes is represented in FIG. 18, where individually requested plaquettes are combined to larger and more regularly shaped (e.g., convex with near minimal circumference) subgraphs, with reserved unused and inactive qubits for crosstalk reduction, etc. as discussed above. The graph of 2-qubit gates naturally provides a criterion for how such a boundary should be defined. For example, one could require that when removing the boundary unused qubits from the 2-qubit graph, the graph components corresponding to different plaquettes must be disconnected, i.e., no path exists that originates in one plaquette and ends in another. A different way of defining which qubits must be unused and inactive could be by using an empirically calibrated matrix of qubit-qubit cross-talk, i.e, a matrix ($S\_jk$) where j and k are labels for qubits on the device which specifies the strength (e.g., in decibels or some other relevant unit) of cross-talk between qubits j and k. In this case the requirement could be to disallow any qubits labeled j, k from different plaquettes to have S\_jk larger than some threshold. Combined plaquette blocks can be merged to form ever larger tiles. For example, plaquettes 1801 and 1802 can be combined, with unused qubits 1806 (open circles) between the plaquettes, forming a first combined plaquette block 1803. The first combined plaquette block 1803 can then be combined with a plaquette block 1804, again with unused qubits between adjacent plaquettes, to form a second combined plaquette block 1805.

Figure 19:
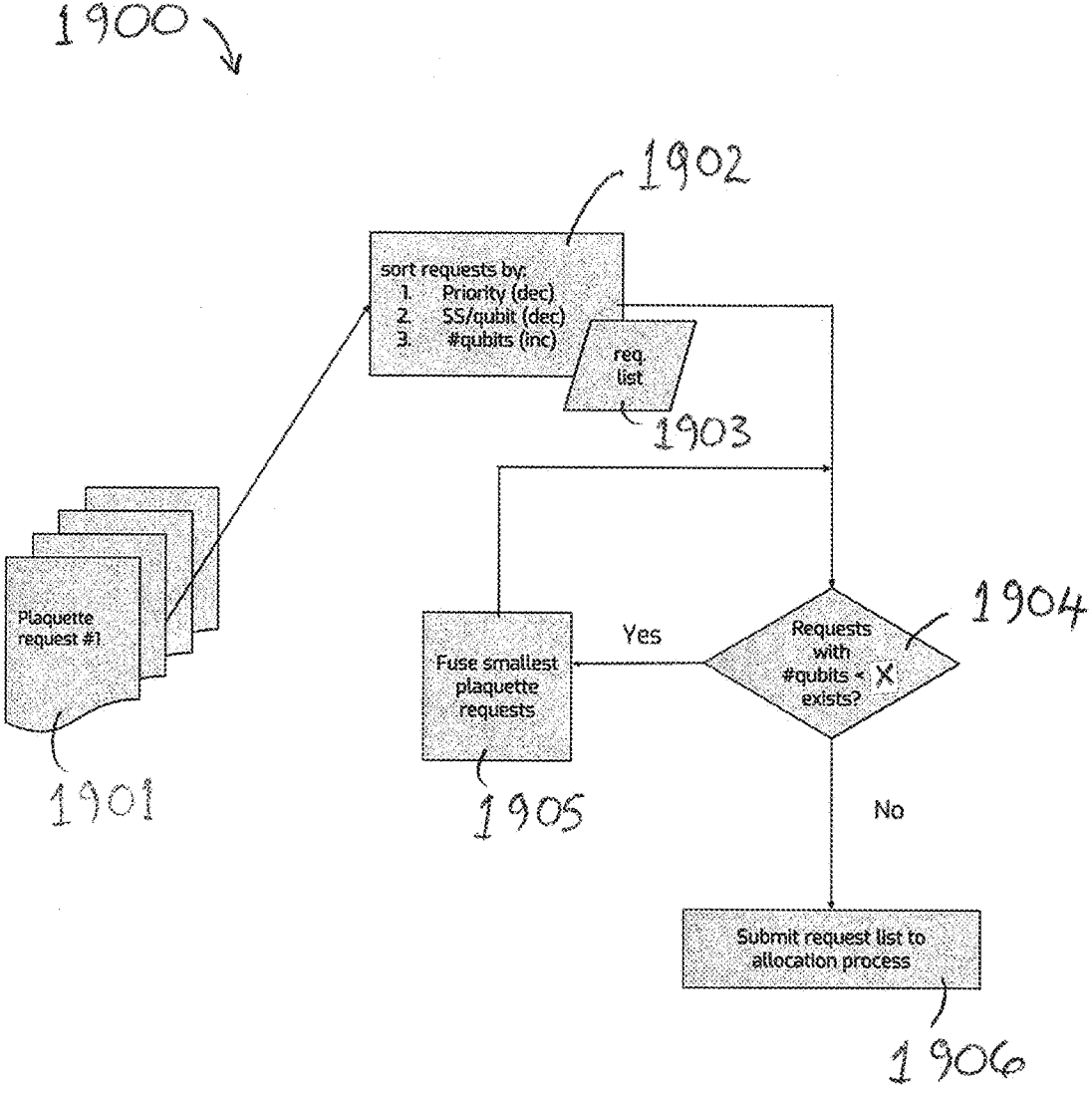
FIG. 19 is a flow chart showing an example plaquette fusion process.

FIG. 19 shows a method 1900, according to some embodiments, to preprocess a list of plaquette requests 1901 by combining requests for plaquettes below a certain size (number of qubit) threshold. For example, there may be a very large number of requests for single and two qubit plaquettes. These should generally be easy to allocate, but any part of the allocation procedure that scales strongly with the total number of requests may be slowed down by the need to handle all these simple requests. By fusing several small requests into a larger request may make the process more efficient. This may reduce the complexity of the subsequent allocation/scheduling step. Specifically, a list of incoming plaquette requests 1903 may be sorted 1902 by one or more of their priority, the effective revenue per qubit and their necessary number of qubits. In a subsequent loop, all requests with number of qubits below some minimal number X, e.g., X=2 or X=10, (see 1904) are successively fused with other requests (see 1905) into a single effective request which now contains more qubits than X. Finally, the list which now only contains requests above a certain size is submitted for further processing (see 1906).

In some instances, a method of plaquette fusion, wherein a plaquette is a configuration of qubits and qubit-qubit links on one or more quantum processor units, may comprise: receiving by a computer processor unit a plurality of plaquette requests; sorting by the computer processor unit the plaquette requests by plaquette qubit count; fusing by the computer processor unit the plaquette requests with plaquette qubit count below a predetermined integer value, X, into one or more fused plaquette requests; and submitting a request list to an allocation process, wherein the request list includes the one or more fused plaquette requests and unfused plaquette requests. Furthermore, computer systems may be configured to fuse plaquettes as described above.

Figure 20:
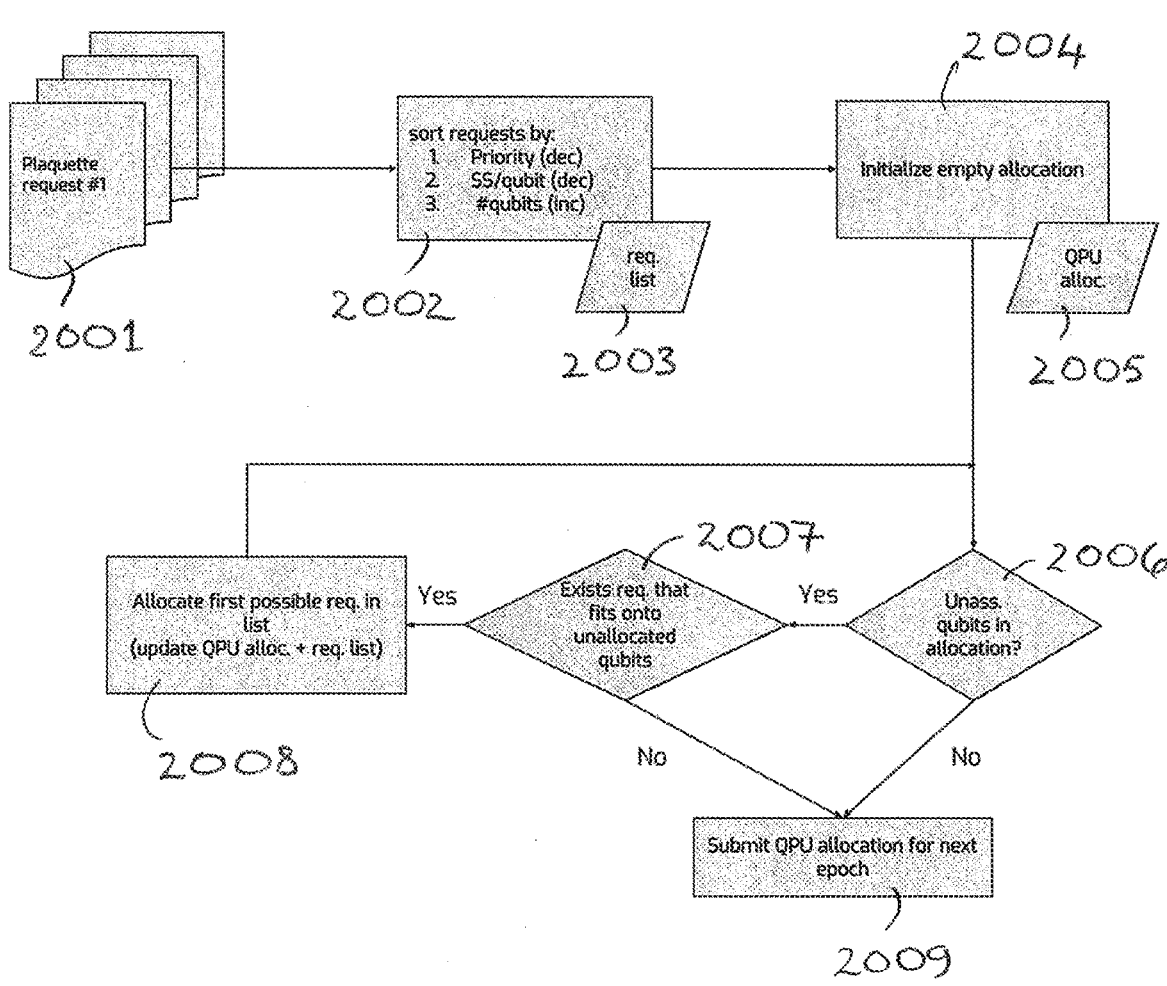
FIG. 20 is a flow chart showing an example greedy plaquette request allocation process.
Figure 21:
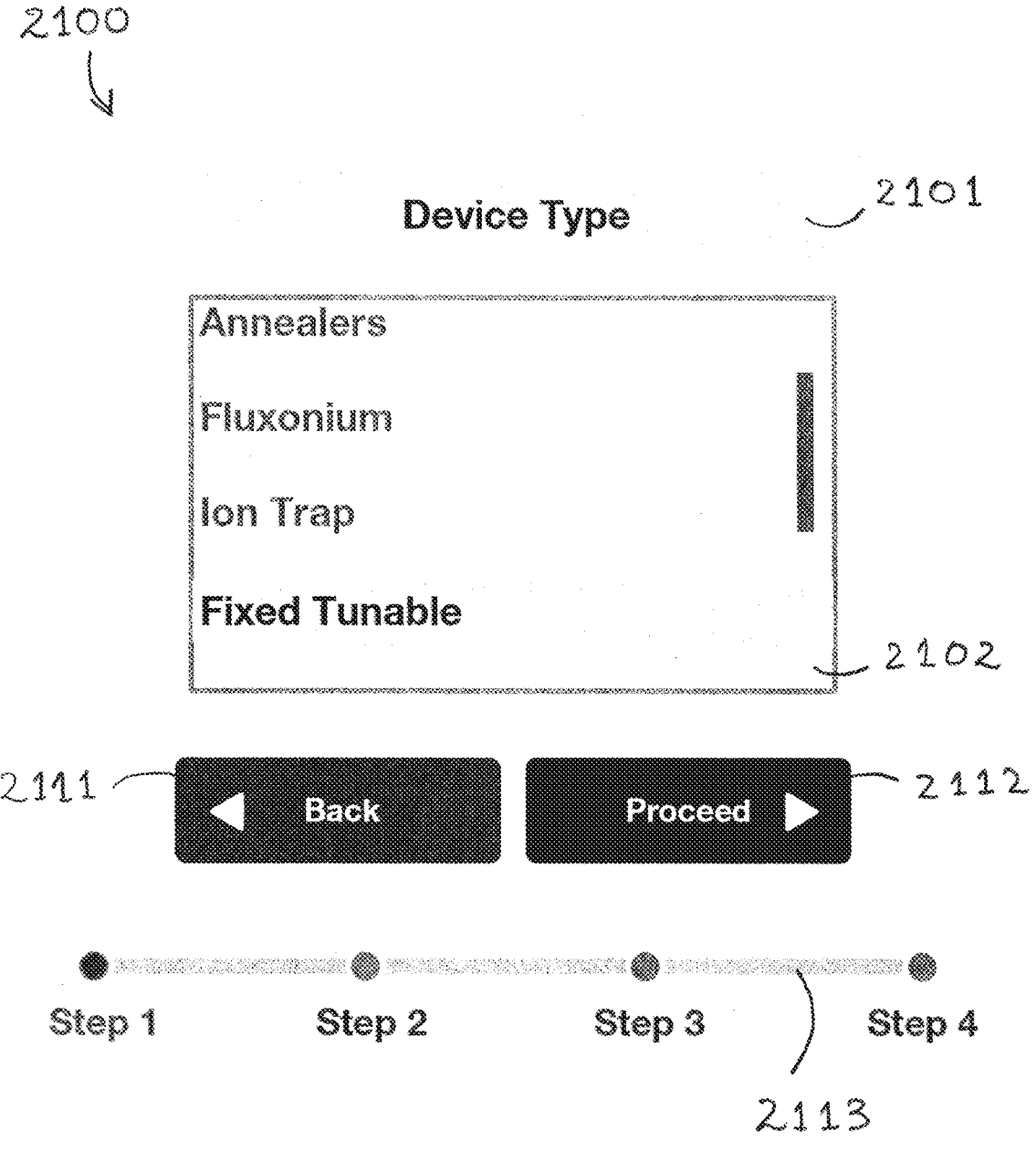
FIGS. 21-24 are representations of graphic user interfaces for web-based systems for the presentation, reservation, and provisioning of individual qubits or sets of qubits from a larger quantum computing system or chip to a particular user, according to a first embodiment.

FIG. 20 shows a method 2000, according to some embodiments, for sorting plaquette requests 2001. Plaquette request list 2003 from the order book is sorted by one or more of: priority, cost per qubit and/or number of qubits (see 2002). An empty allocation 2005 of plaquettes for the QPU is created (see 2004) and is subsequently filled in a loop (see 2006-2009): starting from the highest priority, highest revenue requests, the QPU is greedily allocated until no more requests exist that can be allocated. Finally, the complete allocation for one epoch is submitted (see 2009). The loop may comprise: determining by the computer processor unit if there are any unassigned qubits in the allocation (see 2006) and (a) if there are no unassigned qubits then submit the QPU allocation for the next available epoch (see 2009), (b) if there are unassigned qubits then further determine if there are any unassigned requests that fit onto the unassigned qubits (see 2007) and (i) if no unassigned requests fit then submit the QPU allocation for the next available epoch (see 2009), (ii) if unassigned requests fit then add the highest priority remaining request to the allocation, update the QPU allocation and the request list, and repeat the determining (go back to 2006).

In some embodiments, a method of plaquette allocation, wherein a plaquette is a configuration of qubits and qubit-qubit links on one or more quantum processor units, may comprise: receiving by a computer processor unit a plurality of plaquette requests; sorting by the computer processor unit requests by one or more of highest priority, highest revenue per qubit, and highest number of qubits; initializing by the computer processor unit an empty quantum processor unit (QPU) allocation; adding by the computer processor unit the highest priority plaquette request to the allocation; and determining by the computer processor unit if there are any unassigned qubits in the allocation and (a) if there are no unassigned qubits then submit the QPU allocation for the next available epoch, (b) if there are unassigned qubits then further determine if there are any unassigned requests that fit onto the unassigned qubits and (i) if no unassigned requests fit then submit the QPU allocation for the next available epoch, (ii) if unassigned requests fit then add highest priority remaining request to the allocation and repeat the determining. Furthermore, computer systems may be configured to allocate plaquettes as described above.

In further embodiments, a computing process for allocating quantum computing resources to specific resource requests as described herein, may further include one or more of: wherein each resource request and allocation may be for a specific period of time as measured in epochs; wherein an allocation may be specified by providing the epoch, by listing the exact qubit addresses on the QPU for each plaquette and assigning each plaquette to a specific resource request; wherein a resource request may specify a user id that is granted exclusive access to the quantum computing resources during the scheduled epoch; wherein the plaquette allocation for a single epoch may be stored in a computer memory and/or on a hard disk, e.g., within a database; and wherein resource requests can originate from different users, where they can have been submitted at different times and they are self-contained.

A computing process for allocating quantum computing resources to specific resource requests as described herein, may further include one or more of: selecting a simultaneously allocable request subset in such a way that it exactly or approximately maximizes revenue; ensuring that request priorities are respected; allocating resources in a round robin fashion across some category of users that submit requests, where the category is defined by a user priority, and/or where the category is defined by a pricing tier; allocating resources based on an auction process with multiple rounds of bidding; applying a heuristic to allocate and schedule user access to qubits on a quantum processor; scheduling a heuristic that operates by hierarchically combining requests for qubit plaquettes of comparable size in order to make the scheduling problem tractable by allocating larger segments of the quantum processor at once, where requested plaquettes can be grouped by their size and connectivity (very small plaquettes are then combined into larger super-plaquettes with ideally very simple shapes-e.g. rectangular-that are subsequently easier to tile the full QPU with; scheduling and partitioning qubits on a quantum processor such that cross-talk from simultaneously executed programs on nearby plaquettes is minimized; scheduling and partitioning that minimizes cross-talk by separating allocated plaquettes by non-allocated qubits (when embedding/allocating requested plaquettes into the QPU connectivity graph one can mark a layer of immediately surrounding "buffer" qubits from being allocated in subsequent embeddings), where the control system for "buffer" qubits may in instances just be idle for the duration of the scheduled epoch.

A computing process for allocating quantum computing resources to specific resource requests as described herein, may further include: combining individually requested plaquettes into larger and more regularly shaped (e.g., convex with near minimal circumference) subgraphs, with reserved "dead" qubits for cross-talk reduction. The graph of 2-qubit gates naturally provides a criterion for how such a boundary could be defined. For example, one could require that when removing the boundary "dead" qubits from the 2-qubit graph, the graph components corresponding to different plaquettes must be disconnected, i.e., no path exists that originates in one plaquette and ends in another. A different way of defining which qubits must be dead could be by using an empirically calibrated matrix of qubit-qubit cross-talk, i.e, a matrix $(S\_jk)$ where j and k are labels for qubits on the device which specifies the strength (e.g., in decibels or some other relevant unit) of cross-talk between qubit j and k. In this case the requirement could be to disallow any qubits labeled j, k from different plaquettes to have S_jk larger than some threshold.

A computing system for allocating quantum computing resources to specific resource requests as described herein, may further include one or more of: a scheduling system that schedules repartitionable connected resources over several time epochs; a scheduling system that minimizes repartitioning overhead associated with scheduling connected resources over several time epochs by stacking requests for similarly sized plaquettes along the time (epoch) axis (i.e., it allocates the same plaquettes to these requests but at different times), wherein the qubit connectivity graph is a graph with all qubits of a QPU as nodes and an edge for every available 2-qubit gate.

It is noted that: a single epoch QPU allocation is given by a specification of non-intersecting plaquettes where each plaquette is assigned to a particular user; and a resource request specifies a minimum number of qubits, a minimum degree of connectivity (or alternatively a specific required connectivity graph), a required level of average quality (gate fidelity, coherence time), a required number of epochs and the price or a range of prices that the user has agreed to pay.

In some embodiments there may be different types of prepaid credits. In some embodiments, a "bin filling" mechanism is used where the available plaquettes are "bronze" plaquettes, a few "silver" plaquettes, and a couple of "gold" ones, which are statically determined blocks, "gold" being the highest value blocks. Other names may be used for the categories, preferably ones that are clearly of different perceived values—for example, one could also use "silver", "gold" and "platinum" categories, where platinum is the highest value. (Value may be determined based on fidelity of qubits, fidelity of gates, connectivity, etc.)

Systems and methods for reservation, purchasing, metering, and billing for virtualized quantum-classical computing are considered in further detail. Here the focus is on the direct user interaction with the system in order to achieve any one or more of: a) viewing the available plaquettes and instances and types thereof; b) viewing pricing information for plaquette reservations; c) reserving plaquettes and quantum-classical instances; d) viewing current accumulated bill and historic usage; and e) purchasing credits to be applied to an user's account balance; etc. Such a web interface may be configured for viewing available plaquettes and/or placing orders (for example, making calendar reservations for a plaquette for a number of epochs to run a user program). This web interface may in embodiments be the user interfaces 202, 203 of FIG. 2, the user interface 301 of FIG. 3 or the user interface 401 of FIG. 4, for example. In some embodiments, the available plaquette information is provided for the web interface by a system that queries the plaquette analysis module (see FIG. 2 and related discussion, or other relevant databases discussed herein). The viewing available plaquettes may include displaying quantum processor types, embeddable plaquettes, numbers of qubits, topologies, qubit quality, availability in real time, etc. The system could also display real time price information, and an option to view historic price information and historic use and performance statistics of a selected qubit, again available in a database such as described herein.

Reservation systems may be configured to: enable users to select custom instances; to provide automated resource allocation; or otherwise. Some example configurations are provided below.

In some embodiments a reservation system may be configured as a custom instance plaquette rental system. The system displays available plaquette and qubit resources to the user on a graphical user interface (GUI), for example. The system may be configured to sort the available resources into one or more of the following categories: available QPU resources by device type, embeddable plaquettes, number of qubits, plaquette topology, qubit quality, etc., to help users quickly find the information and qubit configuration they need. The system can have one or more of the following input fields with the option to choose different resources with options such as listed: rental type input field, with options of part plaquette or whole plaquette; qubit connectivity pattern, with options of linear, ring, fully connected, star, custom (which may be a locked option only available to certain users), etc.; device type input field, with options of annealers, fixed tunable qubits, fluxonium qubits, ion trap qubits, etc.; availability of resources, with options of percent of time allocated, calendar time, etc.; booking type, with options of specified time starting now, specify start time and duration, etc.; overall resource priority, with options of cost, performance or quality, and sub-options of low, medium, high, emergency, etc.; and classical resource priority, with options of memory, CPU, or balanced memory and CPU.

In some embodiments a reservation system may be configured as an automatic configuration plaquette rental system. The system prompts a user to upload code that the user wishes to run so that the code may be analyzed by the system to determine a basic level of resource requirements to enable the code to be run. (Note that this step may in some embodiments be run anonymously as described above with reference to FIG. 16, for example.) The system requests input from the user regarding: desired fidelity, with options of different ranges of fidelity which ranges may be classified for example as silver, gold or platinum where platinum is the best; and priority, with options of low, medium, high or emergency, for example, where the categories increase in price with the level of urgency and the higher priced options will provide the user with access at or above their requested fidelity sooner. The system then parses the uploaded code and returns to the user recommendations on suitable resources, including one or more of: a qubit connectivity pattern, which may be linear, ring, fully connected, star, custom (which may be available only to select users), etc.; quantum processor types, which may be annealers, fixed tunable qubits, fluxonium qubits, ion traps, etc.; availability of resources, which may be percent of time allocated, calendar booking, etc.; booking type, which may be by specified time starting now, specified start time and duration, etc.; overall resource priority, which may be cost, performance or quality based, and further categorized as one of low, medium, high, emergency, etc.; and classical resource priority, which may be memory, CPU, or balanced memory and CPU. After recommendations are provided to the user, the system may offer the user limited customization (or fine tuning) of fidelity, for example, or other advanced features.

Some examples of graphic user interfaces for web-based systems for the presentation, reservation, and provisioning of individual qubits or sets of qubits from a larger quantum computing system or chip, to a particular user are shown in FIGS. 21-26. These web-based systems may be used for the configuration of virtualized quantum resources and classical co-processing resources to meet user requirements. Furthermore, these web-based systems may be used for the visualization of quantum machine images (a virtualized programming and execution environment designed for users to develop and run quantum software applications) and resource loading of particular qubits/plaquettes.

FIGS. 21-24 are a series of user interactive screens that can in some embodiments be used to provide the user the ability to select options for a custom plaquette rental. For example, starting with the GUI 2100 of FIG. 21, a user is able to choose the type of QPU or "device" 2101 on which the user wants to rent a plaquette. The user can select, by clicking or otherwise, a device type from the menu 2102, which includes the following QPU types: annealers, fluxonium, ion trap, and fixed tunable. Note the scroll bar may be used to reveal more types of devices in the menu. Once the device type is selected the user can move on to the next step in the selection process by clicking, or other selection action, on the "proceed" button 2112. Should it be necessary the user can also go back to an early step in the process by clicking, or other selection action, the "back" button 2111. Progress through the process can be readily seen in the "step" indicator 2113.

Figure 22:
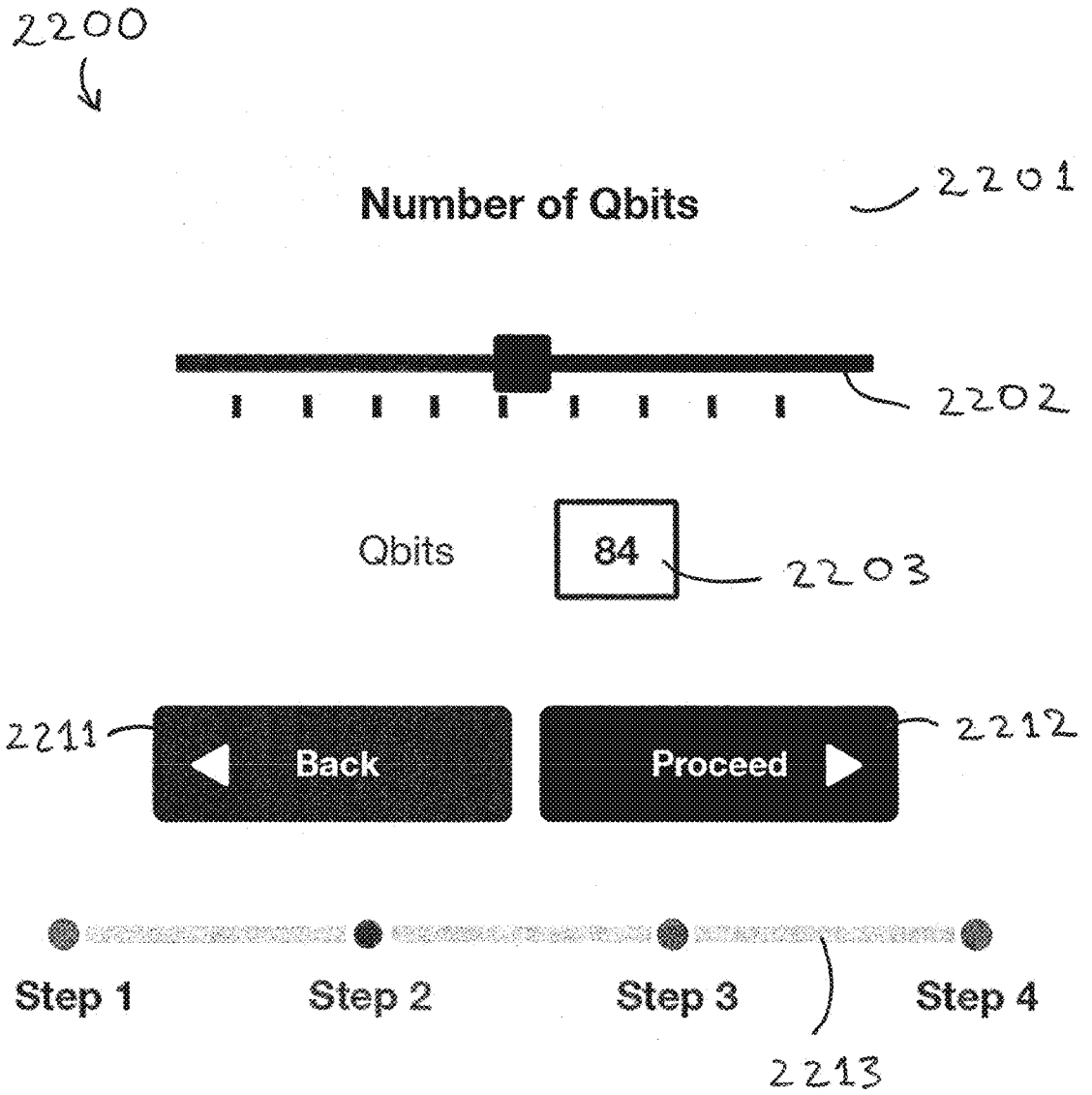

The next step is available in the GUI 2200 of FIG. 22, a user is able to choose the number of qubits or "Qbits" 2201 in a plaquette. The user can select the number of qubits by using the slider 2202 or entering the number directly in box 2203, or by a similar interactive method. Once the number of qubits is selected the user can move on to the next step in the selection process by clicking, or other selection action, on the "proceed" button 2212. Should it be necessary the user can also go back to an early step in the process by clicking, or other selection action, the "back" button 2211. Progress through the process can be readily seen in the "step" indicator 2213.

Figure 23:
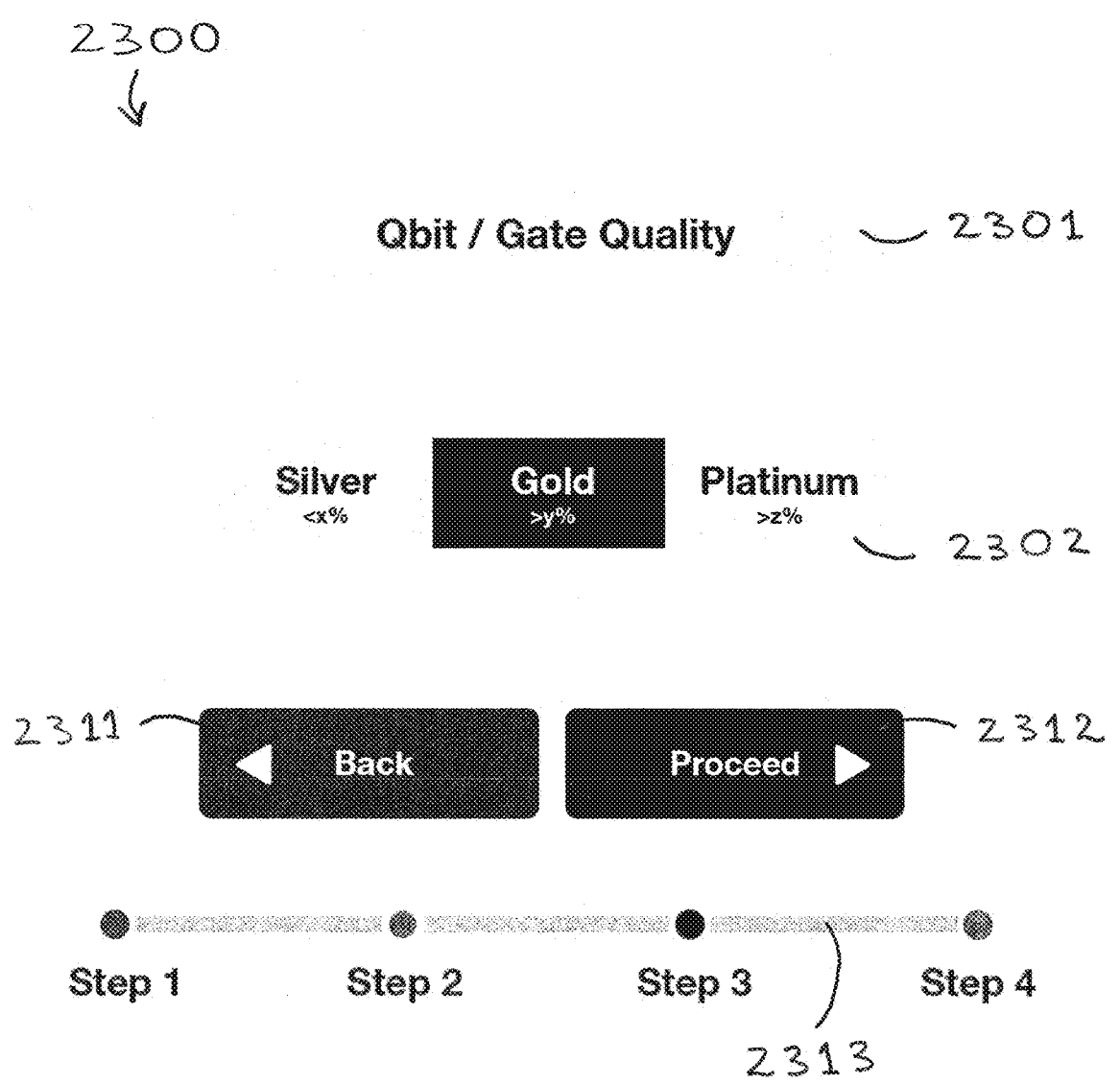

The next step is available in the GUI 2300 of FIG. 23, a user is able to choose the qubit ("Qbit") or gate quality 2301 for the gates/qubits in the plaquette. The user can select the quality of qubits or gates by clicking, or other selection process, the desired quality button 2302—in this example silver, gold or platinum. Once the number of qubits is selected the user can move on to the next step in the selection process by clicking, or other selection action, on the "proceed" button 2312. Should it be necessary the user can also go back to an early step in the process by clicking, or other selection action, the "back" button 2311. Progress through the process can be readily seen in the "step" indicator 2313.

Figure 24:
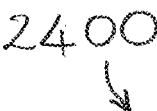

The next step is available in the GUI 2400 of FIG. 24, a user is able to choose the topology 2401 for the configuration of qubits in the plaquette. The user can select, by clicking or otherwise, a topology from the menu 2402, which in this example include the following configurations of qubits: linear, ring, star and fully connected. Note the scroll bar may be used to reveal more topologies in the menu. Once the topology is selected the user can move on to the next step in the selection process by clicking, or other selection action, on the "proceed" button 2412. Should it be necessary the user can also go back to an early step in the process by clicking, or other selection action, the "back" button 2411. Progress through the process can be readily seen in the "step" indicator 2413.

Figure 25:
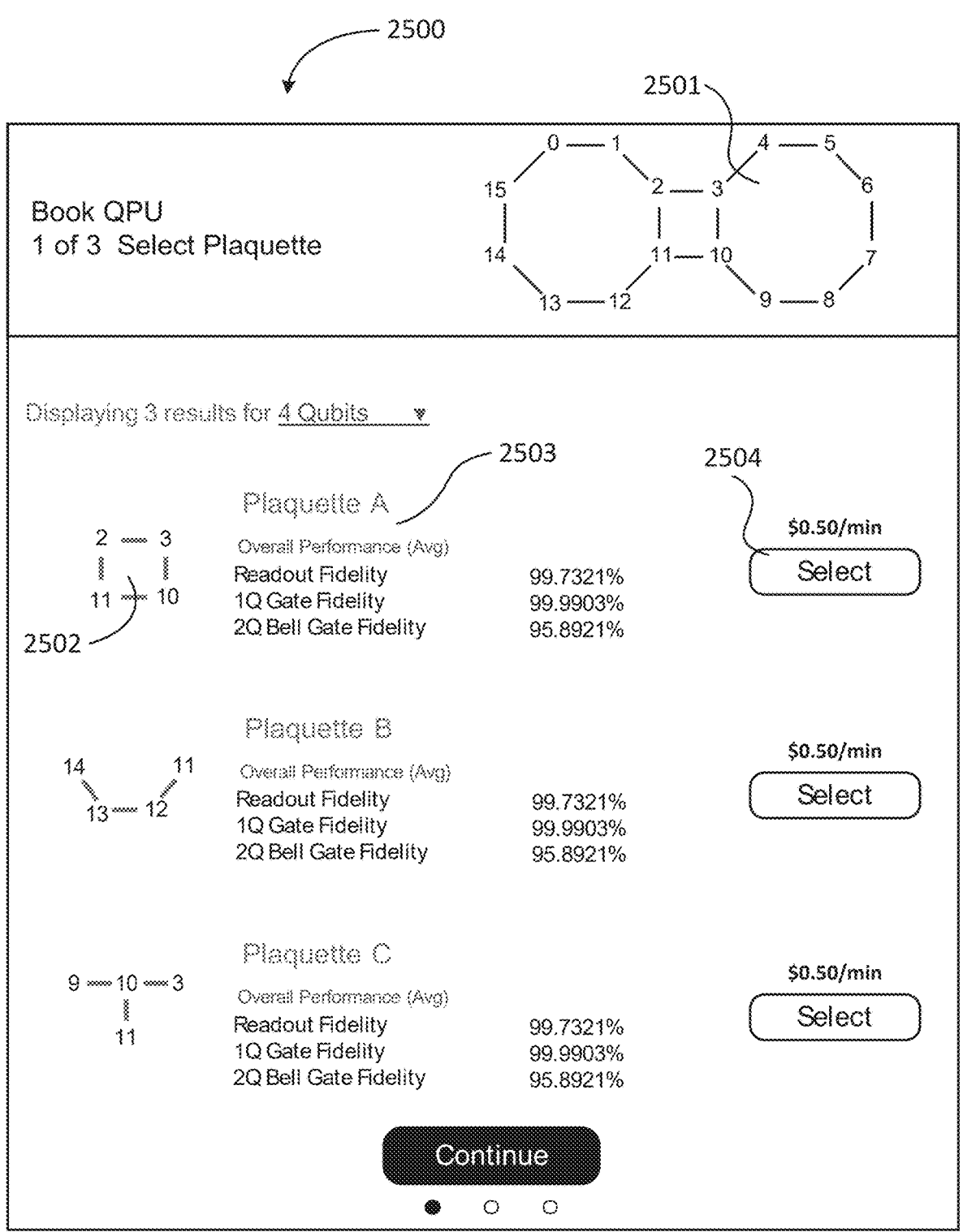
FIGS. 25-26 are representations of graphic user interfaces for web-based systems for the presentation, reservation, and provisioning of individual qubits or sets of qubits from a larger quantum computing system or chip to a particular user, according to a second embodiment.
Figure 26:
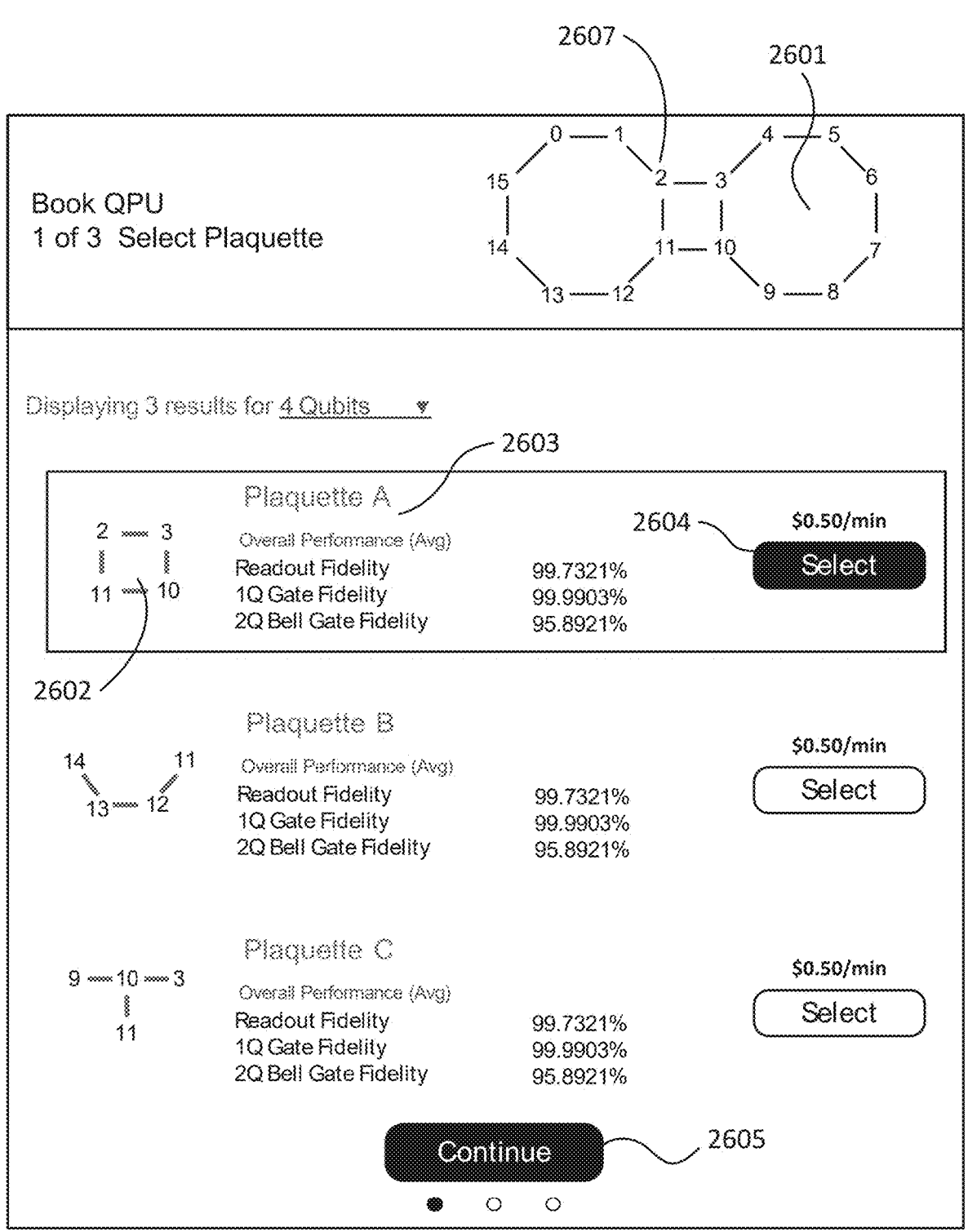

FIG. 25 shows an example of an interactive screen—GUI 2500—that can be used to book plaquettes on a QPU. A wire frame type representation 2501 of the configuration of qubits and qubit-qubit connections on a QPU is shown in the top right-hand corner of the GUI. Information on different plaquettes available on the QPU is provided; in this example they are all 4 qubit plaquettes. The information includes wire frame representations 2502 of the plaquettes, showing the topology and connectivity of the plaquettes, performance details 2503, which can include readout fidelities, one qubit gate fidelities, two qubit Bell state fidelities, etc., a price to rent the qubit, in this example given in dollars per minute, and a "select" button 2504, which can be used to select the plaquette, and in some embodiments may be used to directly purchase the plaquette. FIG. 26 shows the same interactive screen as in FIG. 25, but after a user has selected plaquette A. The selected plaquette A is clearly indicated by one or more of: a "selected" button 2604, which may be given a color that causes the button to stand out; a highlighted area 2606 surrounding the wire frame representations 2602, the performance details 2603, the price to rent the qubit, and the "selected" button 2604; and the selected qubits 2607 are seen to be highlighted in the wire frame representation 2601 of the QPU. A "continue" button 2605 can be used to move on to the next page of the booking interface, which in some embodiments may be a payment page, and in other embodiments may be a purchase confirmation page, if the "select" button 2504 is a direct purchase button.

Furthermore, in some embodiments an interactive screen may be provided to a user that allows the user to check the quality/performance data for individual qubits and edges in a wire frame representation of plaquettes and qubits on a QPU. The user may access this information by: moving a screen cursor over a qubit or edge, selecting a qubit or edge, etc. Selection and/or movement of a screen cursor may be achieved using a mouse, a touch screen, hand tracking, eye tracking, tapping, as part of an augmented reality or virtual reality experience, etc. Furthermore, in some embodiments a wire frame representation of a quantum processor may show particular properties of qubits and edges by using different colors, heat maps, size of qubit, thickness of edge, etc. to represent the value of specific properties on a sliding, discrete or calibrated scale.

In some embodiments, billing and metering of usage can be done while preserving customer security and an agreement that the service provider won't inspect the semantics of the user's programs or how the user is using their data. Information regarding billing and metering may be accessed through a web interface such as described above.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

Data-processing apparatus encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of allocating plaquettes in an array of qubit devices of a quantum processor unit (QPU), the method comprising:

receiving, at a classical computer system, QPU data representing (i) a physical layout of the QPU including an arrangement of qubit devices and qubit-qubit links and (ii) performance measurements of the respective qubit devices;

receiving, at the classical computer system, a user request to execute a quantum algorithm, wherein the user request indicates an algorithm topology representing a topology of qubit devices and qubit-qubit links to execute the quantum algorithm;

identifying candidate plaquettes at least partly based on matching the algorithm topology with combinations of the qubit devices and qubit-qubit links, wherein the candidate plaquettes comprise respective subsets of the qubit devices and qubit-qubit links in the array of qubit devices;

selecting, by operation of the classical computer system, a selected plaquette from the candidate plaquettes to execute the quantum algorithm, the selected plaquette being selected based on the QPU data and the algorithm topology; and causing the selected plaquette to execute the quantum algorithm.

2. The method of claim 1, wherein receiving the QPU data includes receiving, as part of the QPU data, instruction-availability information representing which quantum instructions are natively available to be expressed among respective combinations of the qubit devices.

3. The method of claim 1, wherein:

the candidate plaquettes include a first plaquette and a second plaquette that respectively satisfy the user request, and selecting the selected plaquette from the candidate plaquettes includes selecting the second plaquette as the selected plaquette when a location of the first plaquette in the QPU blocks a greater percentage of complementary plaquettes than a location of the second plaquette from executing on the QPU simultaneously with the quantum algorithm, wherein the complementary plaquettes are plaquettes that match quantum algorithms that are executed on the QPU in parallel with the quantum algorithm.

4. The method of claim 1, wherein the selected plaquette is selected at least partly based on which of the candidate plaquettes excludes a qubit device that is used in a set of large adjacent plaquettes, wherein a large adjacent plaquette comprises a set of contiguous qubit devices having more qubit devices than the selected plaquette.

5. The method of claim 1, wherein identifying the candidate plaquettes is at least partly based on comparing performance requests in the user request with the performance measurements of the combinations of the qubit devices and qubit-qubit links to determine that the candidate plaquettes respectively satisfy the performance requests.

6. The method of claim 1, wherein the performance measurements include measurements of gate operation properties of the respective qubit devices and the respective qubit-qubit links, including at least one of a gate fidelity, a native gate availability, a qubit count, a link count, a link topology, a readout fidelity, a qubit coherence time, and a qubit relaxation time.

7. The method of claim 1, comprising:

identifying a high-activity program link that is a qubit-qubit link in the algorithm topology that corresponds to more quantum operations than other qubit-qubit links in the algorithm topology;

identifying one or more qubit-qubit links in the array of qubit devices associated with above-average measured fidelities; and identifying the candidate plaquettes at least partly based on selecting, as the candidate plaquettes, a set of plaquettes for which the high-activity program link is matched with the identified one or more qubit-qubit links.

8. The method of claim 1, wherein matching the algorithm topology with the combinations of the qubit devices and qubit-qubit links includes matching quantum operations associated with respective parts of the algorithm topology with native gate sets of corresponding parts of the candidate plaquettes.

9. The method of claim 1, wherein identifying the candidate plaquettes at least partly based on an analysis that compares time requirements of the user request with coherence times in the performance measurements.

10. The method of claim 1, further comprising arranging non-overlapping plaquettes comprising the selected plaquette that concurrently execute respective quantum algorithms on the array of qubit devices, and the respective quantum algorithms comprising the quantum algorithm of the user request.

11. A computing system, comprising:
one or more processors; and
a memory storing instructions that, when executed on the one or more processors, cause the computing system to:
receive quantum processing unit (QPU) data representing (i) a physical layout of a QPU including an arrangement of qubit devices and qubit-qubit links and (ii) performance measurements of the respective qubit devices;
receive a user request to execute a quantum algorithm, wherein the user request indicates an algorithm topology representing a topology of qubit devices and qubit-qubit links to execute the quantum algorithm;
identify candidate plaquettes at least partly based on matching the algorithm topology with combinations of the qubit devices and qubit-qubit links, wherein the candidate plaquettes comprise respective subsets of the qubit devices and qubit-qubit links in an array of qubit devices;
select a selected plaquette from the candidate plaquettes to execute the quantum algorithm, the selected plaquette being selected based on the QPU data and the algorithm topology; and
cause the selected plaquette to execute the quantum algorithm.

12. The computing system of claim 11, wherein:
the candidate plaquettes include a first plaquette and a second plaquette that respectively satisfy the user request,
the instructions cause the computing system to select the selected plaquette from the candidate plaquettes by selecting the second plaquette as the selected plaquette when a location of the first plaquette in the QPU blocks a greater percentage of complementary plaquettes than a location of the second plaquette from executing on the QPU simultaneously with the quantum algorithm, and
the complementary plaquettes are plaquettes that match quantum algorithms that are executed on the QPU in parallel with the quantum algorithm.

13. The computing system of claim 11, wherein the selected plaquette is selected at least partly based on which of the candidate plaquettes excludes a qubit device that is used in a set of large adjacent plaquettes, wherein a large adjacent plaquette comprises a set of contiguous qubit devices having more qubit devices than the selected plaquette.

14. The computing system of claim 11, wherein the instructions cause the computing system to identify the candidate plaquettes at least partly based on comparing performance requests in the user request with the performance measurements of the combinations of the qubit devices and qubit-qubit links to determine that the candidate plaquettes respectively satisfy the performance requests.

15. The computing system of claim 14, wherein the performance measurements include measurements of gate operation properties of the respective qubit devices and the respective qubit-qubit links, including at least one of a gate fidelity, a native gate availability, a qubit count, a link count, a link topology, a readout fidelity, a qubit coherence time, and a qubit relaxation time.

16. The computing system of claim 11, wherein the instructions cause the computing system to:
identify a high-activity program link that is a qubit-qubit link in the algorithm topology that corresponds to more quantum operations than other qubit-qubit links in the algorithm topology,
identify one or more qubit-qubit links in the array of qubit devices associated with above-average measured fidelities, and
identify the candidate plaquettes at least partly based on selecting, as the candidate plaquettes, a set of plaquettes for which the high-activity program link is matched with the identified one or more qubit-qubit links.

17. The computing system of claim 11, wherein matching the algorithm topology with the combinations of the qubit devices and qubit-qubit links includes matching quantum operations associated with respective parts of the algorithm topology with native gate sets of corresponding parts of the candidate plaquettes.

18. The computing system of claim 11, wherein the instructions cause the computing system to identify the candidate plaquettes at least partly based on an analysis that compares time requirements of the user request with coherence times in the performance measurements.

19. A non-transitory computer-readable medium comprising instructions that, when executed by one or more processors of a computing system, cause the computing system to:
receive quantum processing unit (QPU) data representing (i) a physical layout of a QPU including an arrangement of the qubit devices and qubit-qubit links and (ii) performance measurements of the respective qubit devices;
receive a user request to execute a quantum algorithm, wherein the user request indicates an algorithm topology representing a topology of qubit devices and qubit-qubit links to execute the quantum algorithm;
identify candidate plaquettes at least partly based on matching the algorithm topology with combinations of the qubit devices and qubit-qubit links, wherein the candidate plaquettes comprise respective subsets of the qubit devices and qubit-qubit links in the array of qubit devices;
select a selected plaquette from the candidate plaquettes to execute the quantum algorithm, the selected plaquette being selected based on the QPU data and the algorithm topology; and
cause the selected plaquette to execute the quantum algorithm.

20. The non-transitory computer-readable medium of claim 19, wherein:

the candidate plaquettes include a first plaquette and a second plaquette that respectively satisfy the user request, the instructions cause the computing system to select the selected plaquette from the candidate plaquettes by selecting the second plaquette as the selected plaquette when a location of the first plaquette in the QPU blocks a greater percentage of complementary plaquettes than a location of the second plaquette from executing on the QPU simultaneously with the quantum algorithm, and the complementary plaquettes are plaquettes that match quantum algorithms that are executed on the QPU in parallel with the quantum algorithm.

* * * * *